United States Patent
Clark

(10) Patent No.: US 9,423,093 B1
(45) Date of Patent: Aug. 23, 2016

(54) UNDER-VEHICLE GROUND EFFECT SYSTEM

(71) Applicant: Allyn Clark, Forest Grove, OR (US)

(72) Inventor: Allyn Clark, Forest Grove, OR (US)

( * ) Notice: Subject to any disclaimer, the term of this patent is extended or adjusted under 35 U.S.C. 154(b) by 34 days.

(21) Appl. No.: 14/578,214

(22) Filed: Dec. 19, 2014

(51) Int. Cl.
*B60Q 1/24* (2006.01)
*F21S 8/10* (2006.01)
*B60Q 1/50* (2006.01)
*B60Q 1/00* (2006.01)
*B60Q 1/26* (2006.01)

(52) U.S. Cl.
CPC ............... *F21S 48/22* (2013.01); *B60Q 1/0035* (2013.01); *B60Q 1/2619* (2013.01); *B60Q 1/2661* (2013.01); *B60Q 1/503* (2013.01); *F21S 48/215* (2013.01)

(58) Field of Classification Search
CPC ...... F21S 48/215; F21S 48/22; B60Q 1/2619; B60Q 1/2661; B60Q 1/503; B60Q 1/0035
USPC .................. 362/509, 495, 505, 506
See application file for complete search history.

(56) References Cited

U.S. PATENT DOCUMENTS

| | | | |
|---|---|---|---|
| 1,638,948 A | | 8/1927 | Masury et al. |
| 2,636,749 A | | 4/1953 | Vahey et al. |
| 3,614,124 A | | 10/1971 | Schwabenlender et al. |
| 5,308,115 A | | 5/1994 | Ruehl et al. |
| 5,915,830 A | * | 6/1999 | Dickson .................. B60R 3/002 362/495 |
| 6,179,430 B1 | * | 1/2001 | Le Du ................. B60H 1/00985 362/23.18 |
| 6,220,737 B1 | | 4/2001 | Baragona |
| 6,392,559 B1 | | 5/2002 | Sharpe, Jr. |
| 6,601,983 B1 | * | 8/2003 | Runfola .................. B60S 1/026 219/202 |
| 6,685,347 B2 | | 2/2004 | Grutze |
| 6,955,455 B2 | * | 10/2005 | Schneider ............ B60Q 1/2615 362/398 |
| 7,175,321 B1 | * | 2/2007 | Lopez ..................... B60Q 1/50 296/21 |
| 7,178,817 B1 | | 2/2007 | Welles et al. |
| 7,413,329 B2 | | 8/2008 | Salazar |
| 7,416,200 B2 | | 8/2008 | Hass et al. |
| 7,525,254 B2 | | 4/2009 | Lys et al. |
| 7,637,514 B2 | | 12/2009 | Kim |
| 8,002,064 B2 | | 8/2011 | Yamada et al. |
| 8,256,782 B2 | | 9/2012 | VanDenberg et al. |
| 8,371,596 B2 | | 2/2013 | Johnson et al. |
| 8,490,988 B2 | | 7/2013 | Takeshita et al. |
| 8,608,356 B1 | | 12/2013 | McGean |
| 8,616,567 B2 | | 12/2013 | Eguchi et al. |
| 8,746,718 B2 | | 6/2014 | Otani et al. |

(Continued)

OTHER PUBLICATIONS

Import-Export Bulletin Board, International Trade Leads, "3W LOGO Car Door Welcome Laser Light LED Photoelectricity Projection Laser," web page, at least as early as May 9, 2014, http://www.imexbb.com/3w-logo-car-door-welcome-laser-light-led-photoelectricity-projection-laser-11509454.htm, 2 pages.

(Continued)

*Primary Examiner* — Bryon T Gyllstrom

(74) *Attorney, Agent, or Firm* — Law Office of Karen Dana Oster, LLC

(57) ABSTRACT

An under-vehicle ground effect system described herein creates recognizable images includes a frame component with an interior compartment and a replaceable face plate with at least one cutout defined therein. At least one light source is positioned within the interior compartment and behind the replaceable face plate. Light from the light source(s) produces a recognizable image when the light source(s) is activated. The recognizable image may be a projected recognizable image and/or a backlit recognizable image.

19 Claims, 30 Drawing Sheets

(56) References Cited

U.S. PATENT DOCUMENTS

| | | | | |
|---|---|---|---|---|
| 9,022,631 | B2* | 5/2015 | Mulder | G02B 6/0011 362/601 |
| 2005/0036327 | A1* | 2/2005 | Patel | B60Q 1/32 362/487 |
| 2006/0176710 | A1* | 8/2006 | Meinke | B60Q 1/2669 362/503 |
| 2006/0291203 | A1* | 12/2006 | Anandan | G02B 6/0043 362/231 |
| 2007/0103902 | A1* | 5/2007 | Hsiao | E04F 13/0871 362/240 |
| 2007/0217186 | A1* | 9/2007 | Liao | G09F 13/04 362/147 |
| 2007/0240346 | A1* | 10/2007 | Li | G09F 13/20 40/544 |
| 2009/0190366 | A1* | 7/2009 | Weitzel | B60Q 1/32 362/473 |
| 2010/0253919 | A1 | 10/2010 | Douglas | |

OTHER PUBLICATIONS

Oracle Lighting "Flood LED Light Pod," web page, at least as early as Dec. 14, 2014, oraclelights.com/catsubcat/catsubcatdisplay.asp?p1=400&p9=CSC1&rewrite=Y&PF=Y, 7 pages.

World Tuning Fans Parts & Accessories, "LED Car Under Door Logo Lights," web page, at least as early as Apr. 30, 2014, http://parts.worldtuningfans.com/, 3 pages.

Imgur, LLC, "This mustang projects a horse on the ground when you open the door," web page, at least as early as Apr. 30, 2014, http://imgur.com/gallery/tmP9SaQ, 8 pages.

Jeremy Laukkonen, "What is Underglow?", web page, at least as early as Apr. 29, 2014, http://cartech.about.com/od/Glossary/a/Underglow-Ground-Effects-Lighting.htm, 2 pages.

Javier Lavagnino, Esq, "ARe Neon or "Underglow" Car Lights Legal?", web page, at least as early as Apr. 29, 2014, http://blogs.findlaw.com/law_and_life/2009/05/are-neon-or-underglow-car-lights-legal.html, 3 pages.

Auto Accessories Garage, "Under Car Lights," web page, at least as early as Apr. 29, 2014, http://www.autoaccessoriesgarage.com/Lighting/Under-Car-Lights, 2 pages.

LEDGlow Lighting, LLC, "LED Underbody Light Kits," web page, at least as early as Apr. 29, 2014, http://www.ledunderboy.com/led-underbody-light-kits.aspx?sitelink=Center, 2 pages.

Nordy Electron Co., Limited, "Illuminated Entry Systems," web page, at least as early as Dec. 12, 2014, http://www.dgruidi.com/Product Class-65-1.html, 2 pages.

* cited by examiner

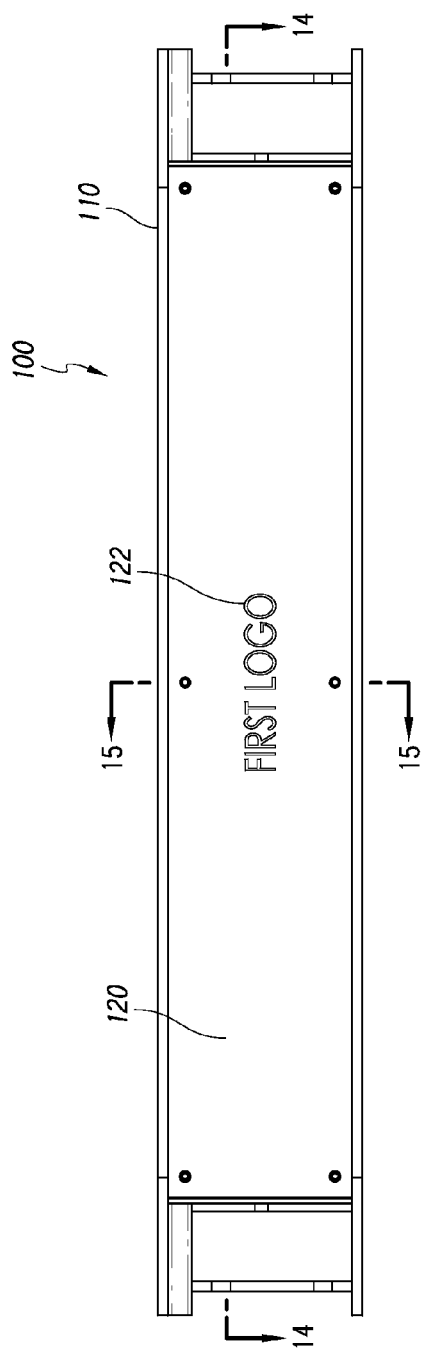
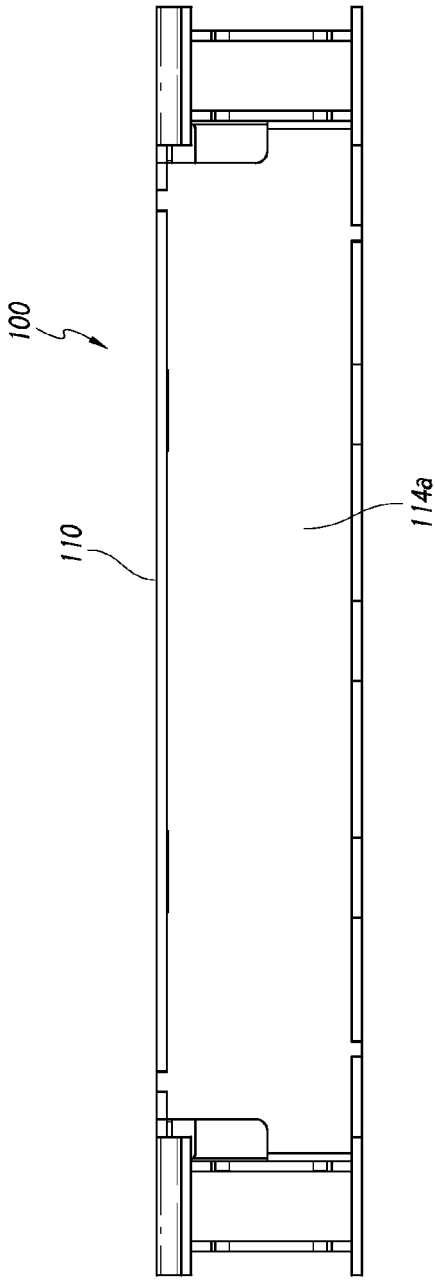
FIG. 4
FIG. 5

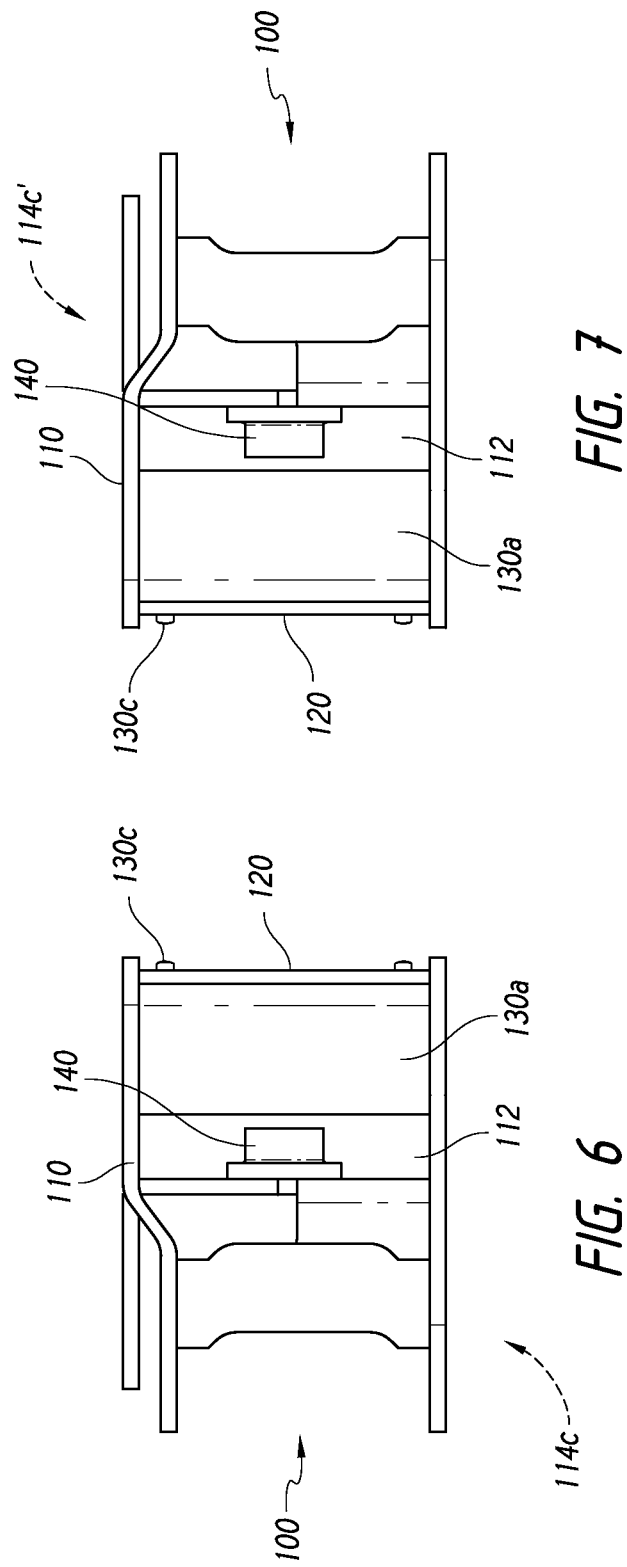

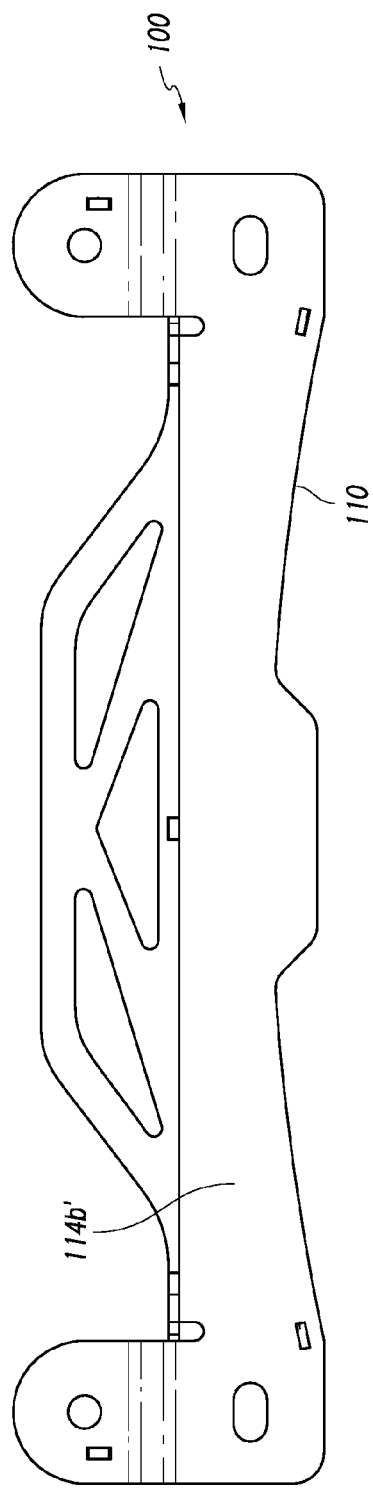
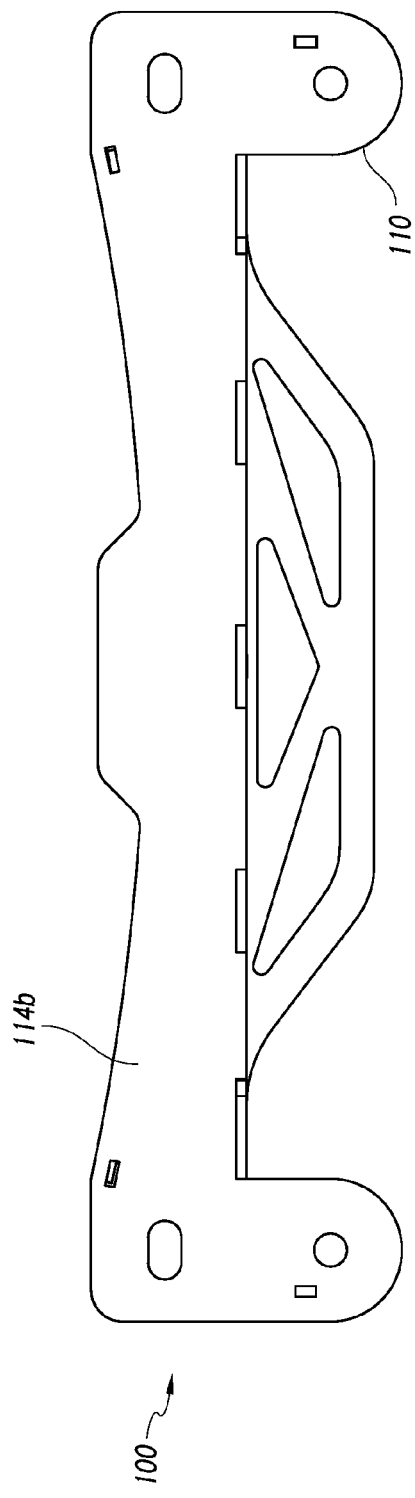
FIG. 8
FIG. 9

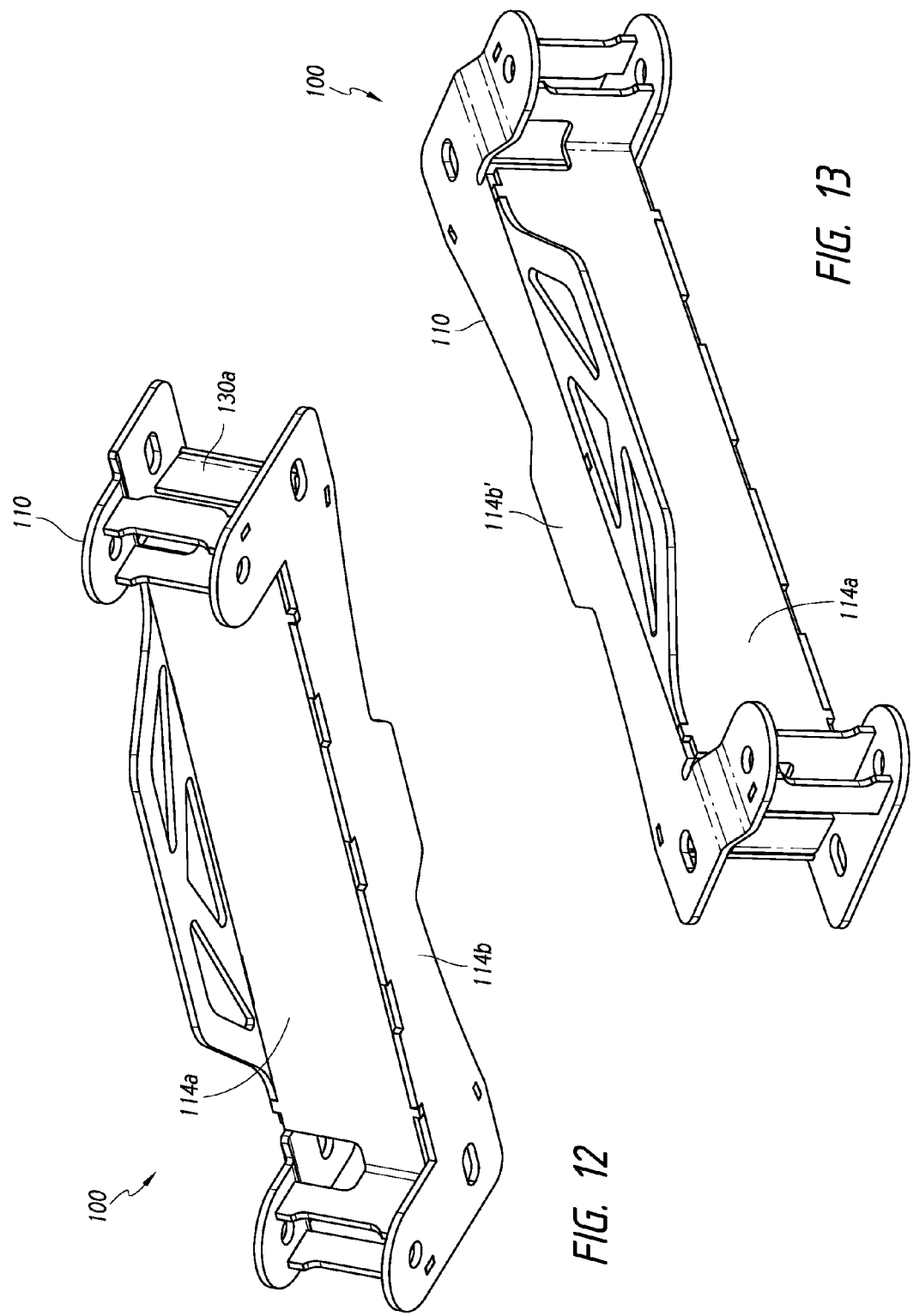

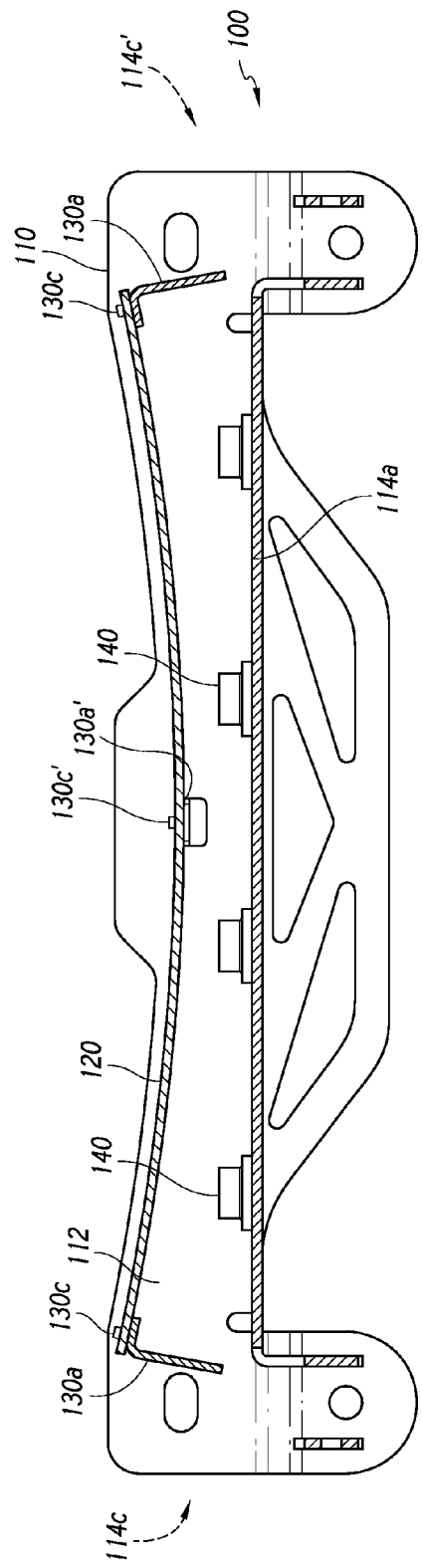
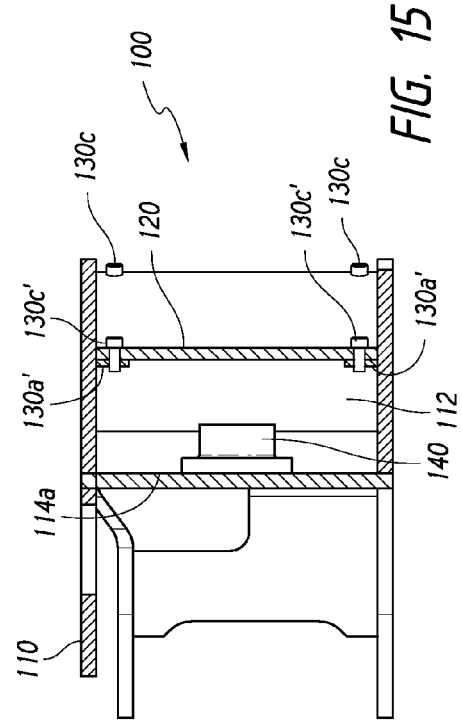
FIG. 14
FIG. 15

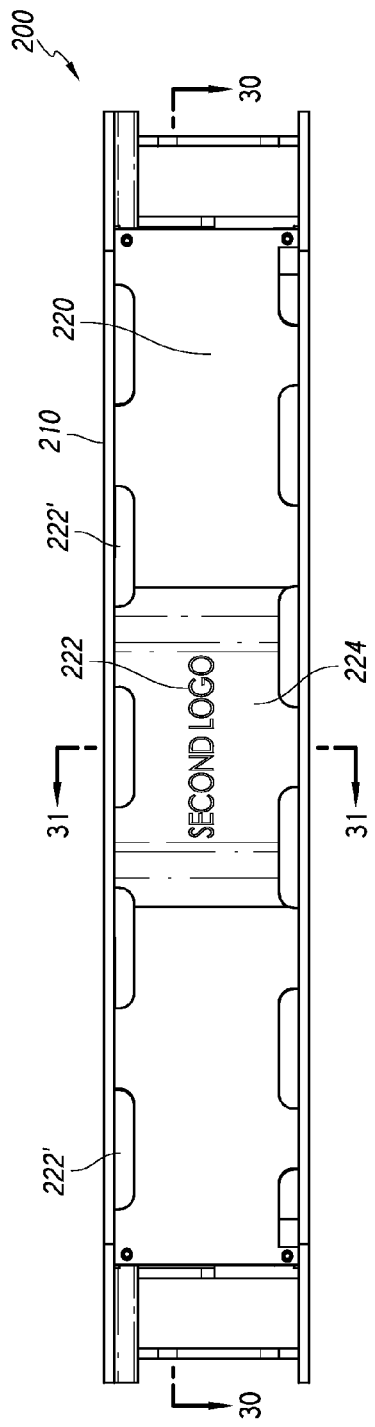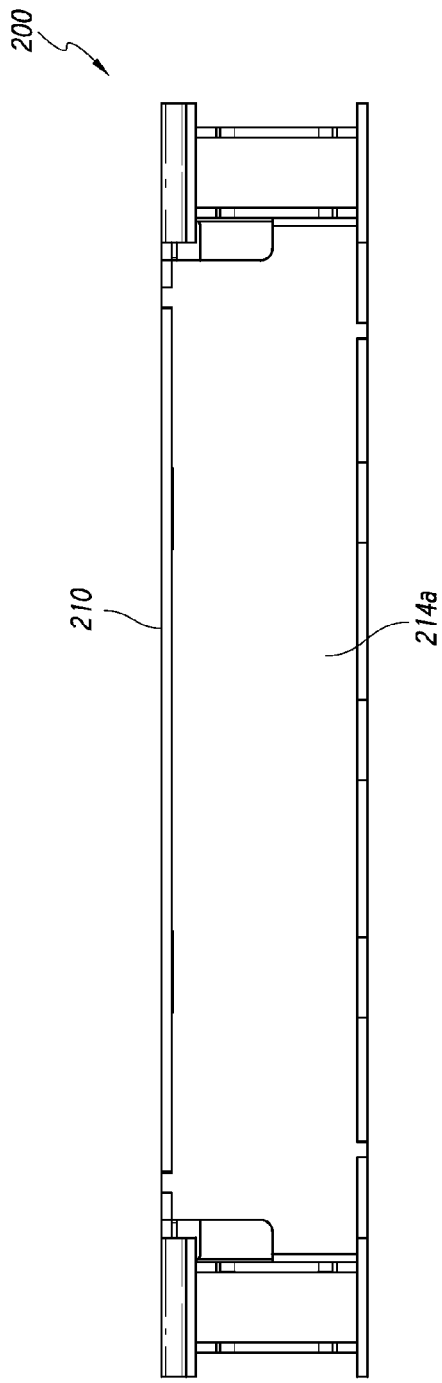
FIG. 20
FIG. 21

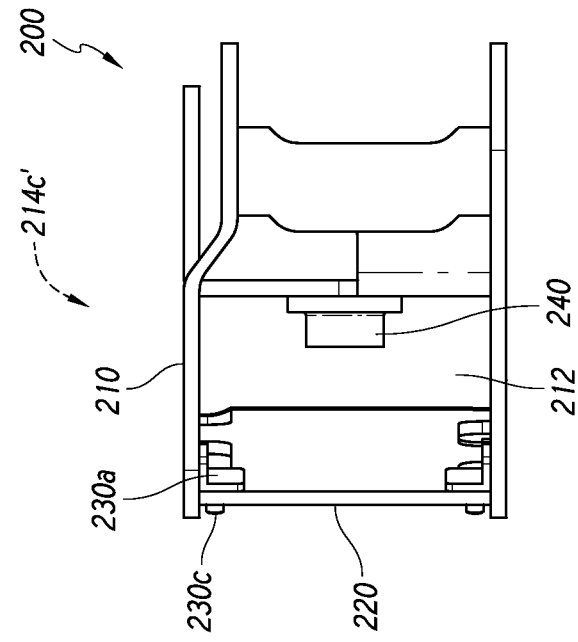
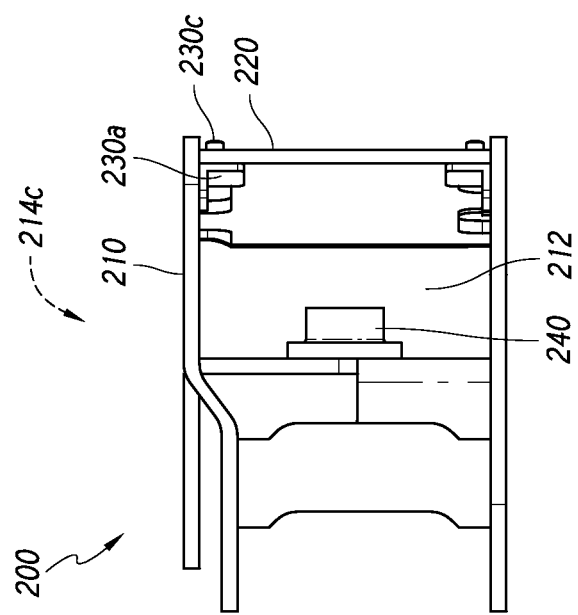

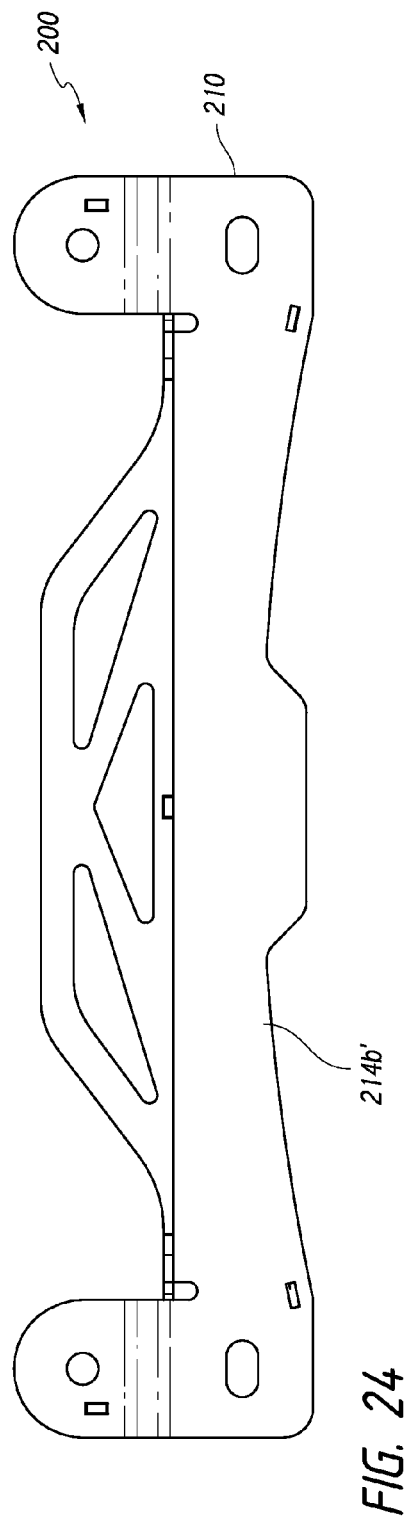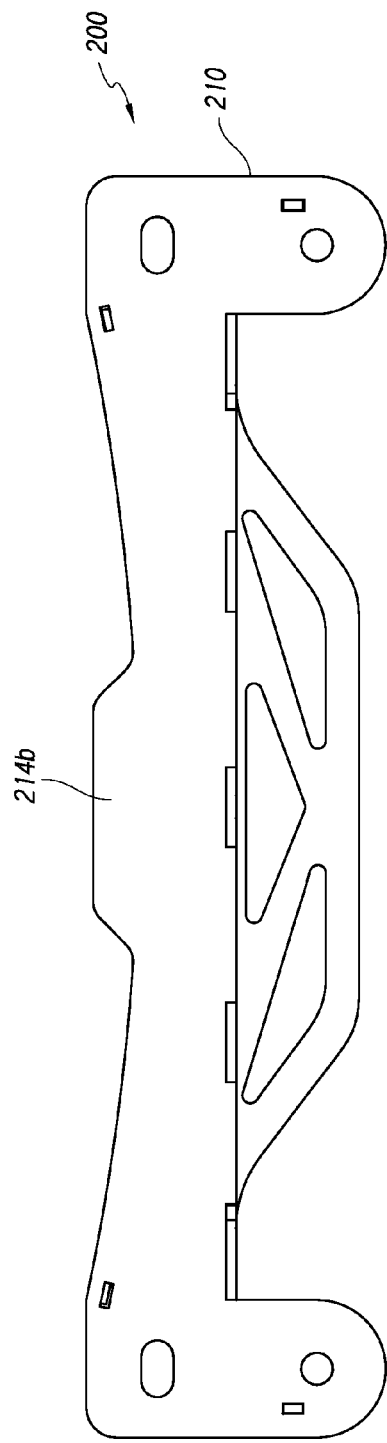
FIG. 24
FIG. 25

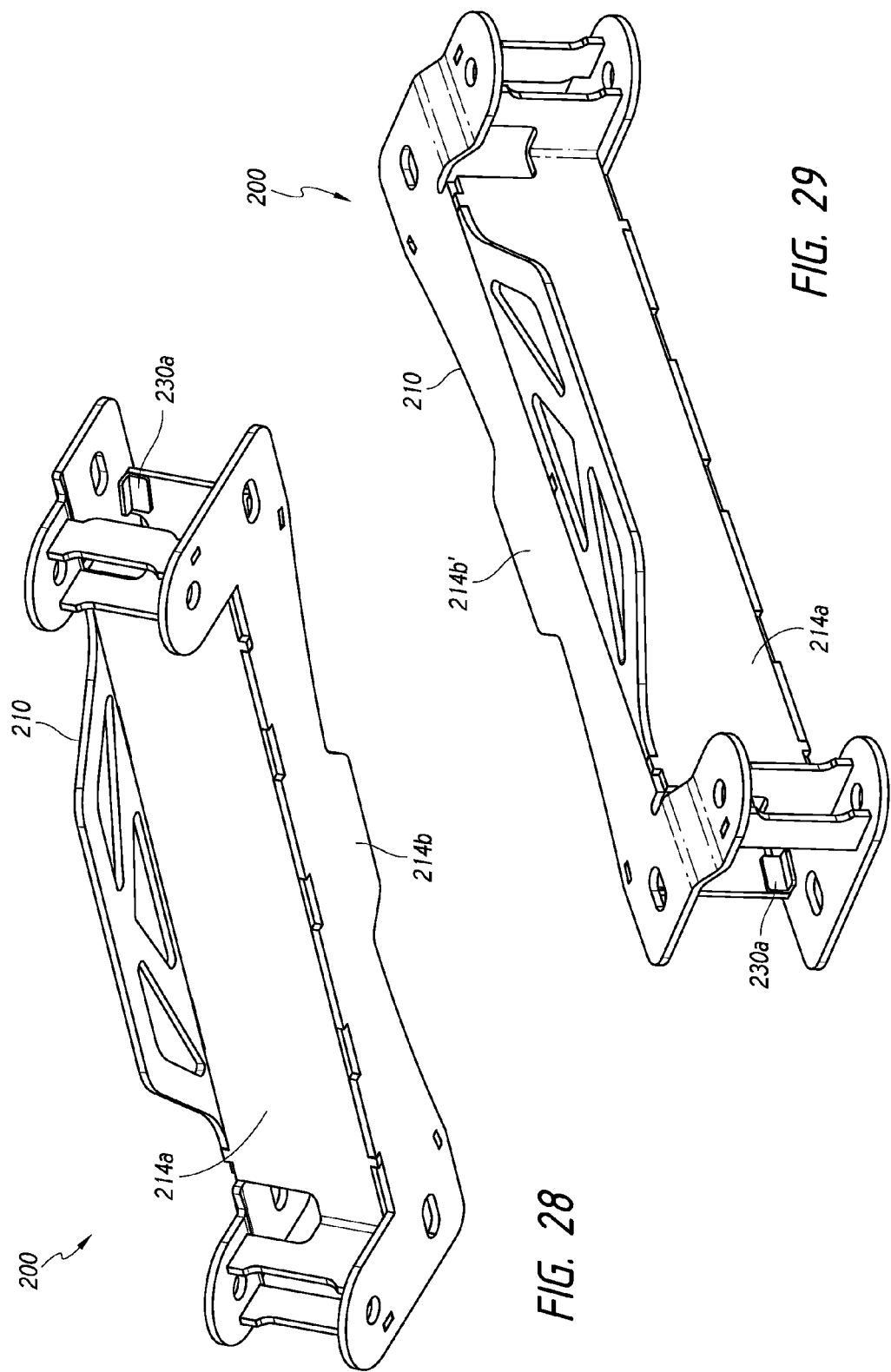

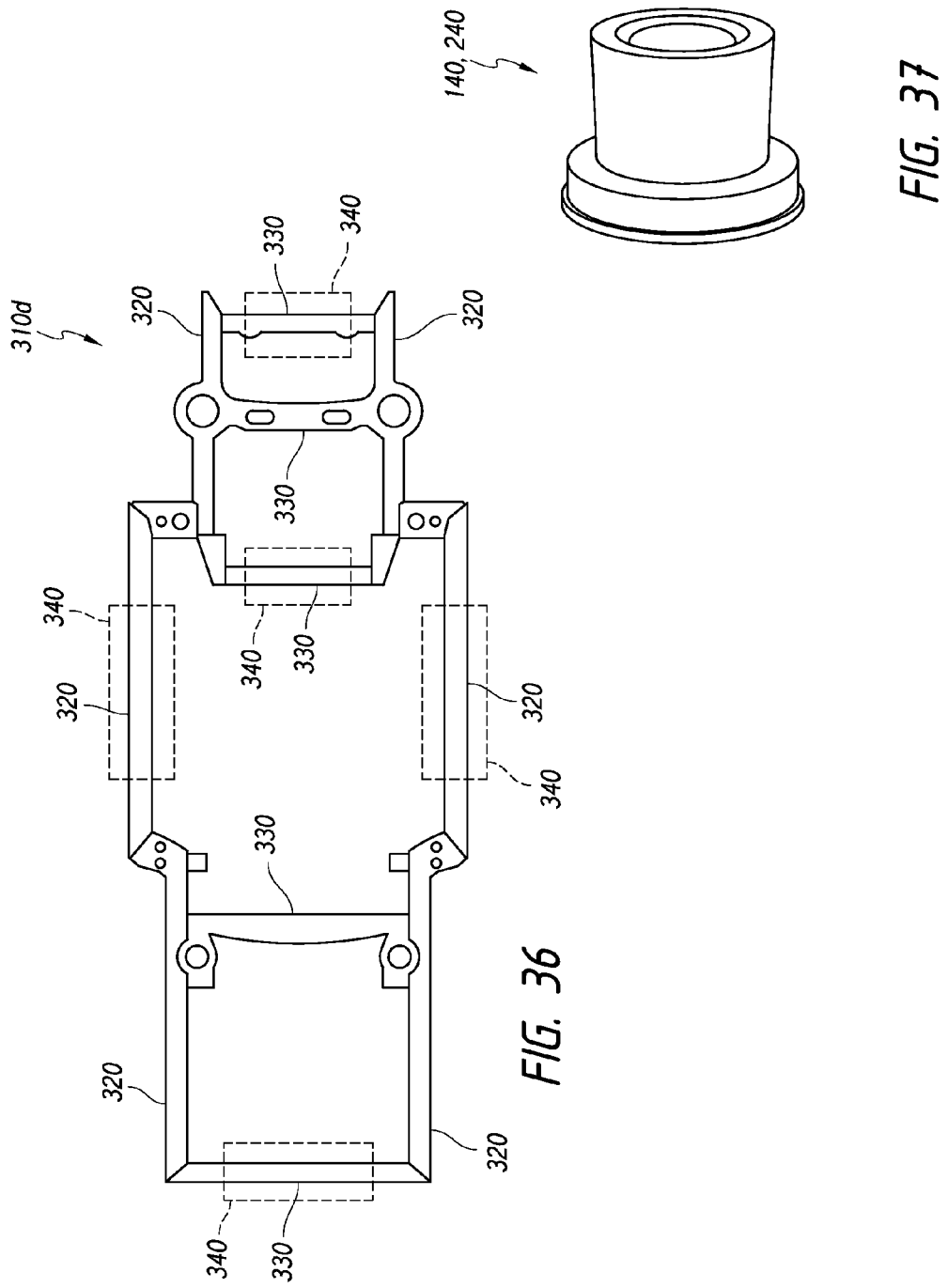

UNDER-VEHICLE GROUND EFFECT SYSTEM

BACKGROUND OF THE INVENTION

Described herein is an under-vehicle ground effect system, and particularly an under-vehicle ground effect system associated with a vehicle frame component with at least one replaceable face plate with at least one cutout, the at least one cutout and a light source within the vehicle frame component creating an image.

In the world of car customization, customizing a car can run the gamut from adding simple accessories (e.g. wheel covers) to more extensive modifications (e.g. lowering the vehicle to the ground or chopping its top). There are a myriad of aftermarket accessories that can help car customizers create the car of their dreams. One of the biggest and yet smallest details that can be used to accent a vehicle is the addition of lighted ornaments. Low-riders have always been into "lighting up." Back in the early '70s, clearance lights would be taken from semi-trailer trucks to light up a low-rider's undercarriage. Later generations of customizers used under-car lighting (e.g. neon and LEDs (light emitting diodes)) devices that were attached to the chassis of a car to illuminate the ground underneath the car. Under-car lighting is often referred to as underglow or ground effects lighting.

Many known patents are directed to lighting accessories that a car customizer can use to customize a car. The following paragraphs detail some of these known systems.

U.S. Pat. No. 6,220,737 to Baragona is directed to a vehicle illumination device that projects an image onto a surface for visually promoting or advertising items, causes, groups, individuals, businesses, or the like in darkness. The Baragona device includes a body that contains an illumination source and a lens aligned therewith. Between the illumination source and the lens is a template or imaging film. The illumination source is powered by the vehicle.

U.S. Pat. No. 6,685,347 to Grutze is directed to a gobo projector for projecting an image onto a paved surface below a vehicle including: a cylindrical body; a light source and reflector at a first end of the body for casting a beam of light toward the opposite end of the body; and a window housing attached to the opposite end of the body. The window housing includes a window opening covered with a transparent material in an airtight manner and a pivotal mirror adapted to reflect the beam of light outward through the window opening. The gobo projector further includes a pair of lenses, interposed between the light source and the mirror, slidably mounted in the housing for adjusting the size and focus of the projected image, a slot for receiving a gobo and a heat shield between the slot and the light source to protect the gobo.

U.S. Pat. No. 7,175,321 to Lopez, is directed to vehicle projector systems that use a light projecting system including at least one light projector adapted to project at least one decorative light design onto at least one exterior portion of a vehicle. The system preferably uses a laser projector and user-selectable controller to select and control decorative designs projected onto the vehicle exterior. The controller may be manually operated, computer programmed, remote controlled or utilize pre-selected programming.

U.S. Pat. No. 7,413,329 to Salazar is directed to undercarriage lights that are positioned under a truck adjacent to parts of the truck requiring regular visual safety inspections to light up the parts. A control module operates the lights in coordination with an ignition switch, a manual switch outside the truck, a timer, a low light sensor, and an indicator light.

U.S. Pat. No. 7,525,254 to Lys, et al., is directed to vehicle lighting methods and apparatus in which an LED-based light source is configured to generate at least visible radiation associated with a vehicle. The light source is controlled such that the generated visible radiation has a variable color over a range of colors including at least three different perceivable colors. Examples of vehicles in which such methods and apparatus may be used include, but are not limited to, an automobile, airplane, boat, non-motorized vehicle, etc. The LED-based light source may be disposed inside the vehicle (e.g. dashboard, instrument panel) or outside the vehicle (e.g., brake lights, undercarriage lighting), and may be controlled to generate white light as one of the perceivable colors. A user interface may be employed to facilitate an adjustment of the variable color of the generated visible radiation. Additionally, information relating to at least one condition associated with the vehicle may be employed to control the LED-based light source such that the variable color of the generated visible radiation is based at least in part on the condition associated with the vehicle.

U.S. Patent Application No. 2010/0253919 to Douglas, is directed to a method and system for laser projection and holographic diffraction grating for a vehicle. The method and system projects an image from a vehicle onto a surface, such as a road or sidewalk. A laser diode assembly is installed in the vehicle and comprises: a light beam source; a power source; a power regulating chip; an image creation means; and, power activating means. A lens is secured to an output end of the laser diode assembly, and comprises a light diffraction image which can be a message, logo, or graphic design. Activation is initiated by switching on the assembly from a position within the interior of the vehicle, or by an activity such as the opening of a door. The activation is ramped up to a full-on state over a pre-set period of time.

In addition to the systems described in the patents listed above, there are illumination products available on the market. Nordy Electron Co., for example, produces illuminated entry systems (see www.dgruidi.com/ProductClass-65-1.html and www.dgruidi.com/ProductClass-65-2.html). Variations of these systems are referred to as "3W logo car door welcome laser LED photoelectricity projection laser," "LED car under door logo light," and "automobile projecting [an image] on the ground when the door is opened."

BRIEF SUMMARY OF THE INVENTION

Described herein is an under-vehicle ground effect system, and particularly an under-vehicle ground effect system associated with a vehicle frame component with at least one replaceable face plate with at least one cutout, the at least one cutout and a light source within the vehicle frame component creating an image.

Described herein is an under-vehicle ground effect system that creates recognizable images. Preferably the system includes at least one frame component having a structural body, the structural body defining an interior compartment. A replaceable face plate is preferably securely attachable to the structural body using at least one secure connector, the replaceable face plate substantially enclosing the interior compartment when secured to the structural body using at least one secure connector. The replaceable face plate preferably has at least one cutout defined therein. At least one light source is preferably positioned within the interior compartment and behind the replaceable face plate. Light from the at least one light source preferably produces at least one recognizable image when the at least one light source is activated behind the replaceable face plate.

It should be noted that preferred frame components may be a cross member or a side rail.

It should be noted that the structural body may include a top face, a front face, and a back face. The front face is preferably substantially parallel to the back face and the top face is preferably at least substantially spanning the distance between the front face and the back face. Preferably the replaceable face plate is substantially parallel to the top face.

It should be noted that the secure connector(s) may be at least one three-part secure connector including at least one structural body connection part, at least one bottom face plate connection part, and at least one joining connection part. The at least one structural body connection part may be perpendicular to the structural body. The at least one structural body connection part may be associated with the front face and at least one structural body connection part may be associated with the back face.

The at least one recognizable image may be at least one projected recognizable image and/or at least one backlit recognizable image.

The subject matter described herein is particularly pointed out and distinctly claimed in the concluding portion of this specification. Objectives, features, combinations, and advantages described and implied herein will be more readily understood upon consideration of the following detailed description of the invention, taken in conjunction with the accompanying drawings.

BRIEF DESCRIPTION OF THE SEVERAL VIEWS OF THE DRAWINGS

The accompanying drawings illustrate various exemplary under-vehicle ground effect systems and/or provide teachings by which the various exemplary under-vehicle ground effect systems are more readily understood.

FIG. 4 is a bottom view of the first exemplary frame component of FIGS. 1-3.

FIG. 5 is a top view of the first exemplary frame component of FIGS. 1-3.

FIG. 6 is a first end view of the first exemplary frame component of FIGS. 1-3.

FIG. 7 is a second end view of the first exemplary frame component of FIGS. 1-3.

FIG. 8 is a back side view of the first exemplary frame component of FIGS. 1-3.

FIG. 9 is a front side view of the first exemplary frame component of FIGS. 1-3.

FIGS. 10-13 are perspective views of the first exemplary frame component of FIGS. 1-3 showing the top and sides thereof.

FIG. 14 is a cross sectional view of the first exemplary frame component and exemplary under-vehicle ground effect system of FIG. 4 taken along the line 14-14.

FIG. 15 is a cross sectional view of the first exemplary frame component and exemplary under-vehicle ground effect system of FIG. 4 taken along the line 15-15.

FIG. 20 is a bottom view of the second exemplary frame component of FIGS. 17-19.

FIG. 21 is a top view of the second exemplary frame component of FIGS. 17-19.

FIG. 22 is a first end view of the second exemplary frame component of FIGS. 17-19.

FIG. 23 is a second end view of the second exemplary frame component of FIGS. 17-19.

FIG. 24 is a back side view of the second exemplary frame component of FIGS. 17-19.

FIG. 25 is a front side view of the second exemplary frame component of FIGS. 17-19.

FIGS. 26-29 are perspective views of the second exemplary frame component of FIGS. 17-19 showing the top and sides thereof.

FIGS. 33-36 are perspective views of exemplary frames showing possible positions for frame components described herein.

FIG. 37 is a perspective side view of an exemplary light source.

Figure 1:
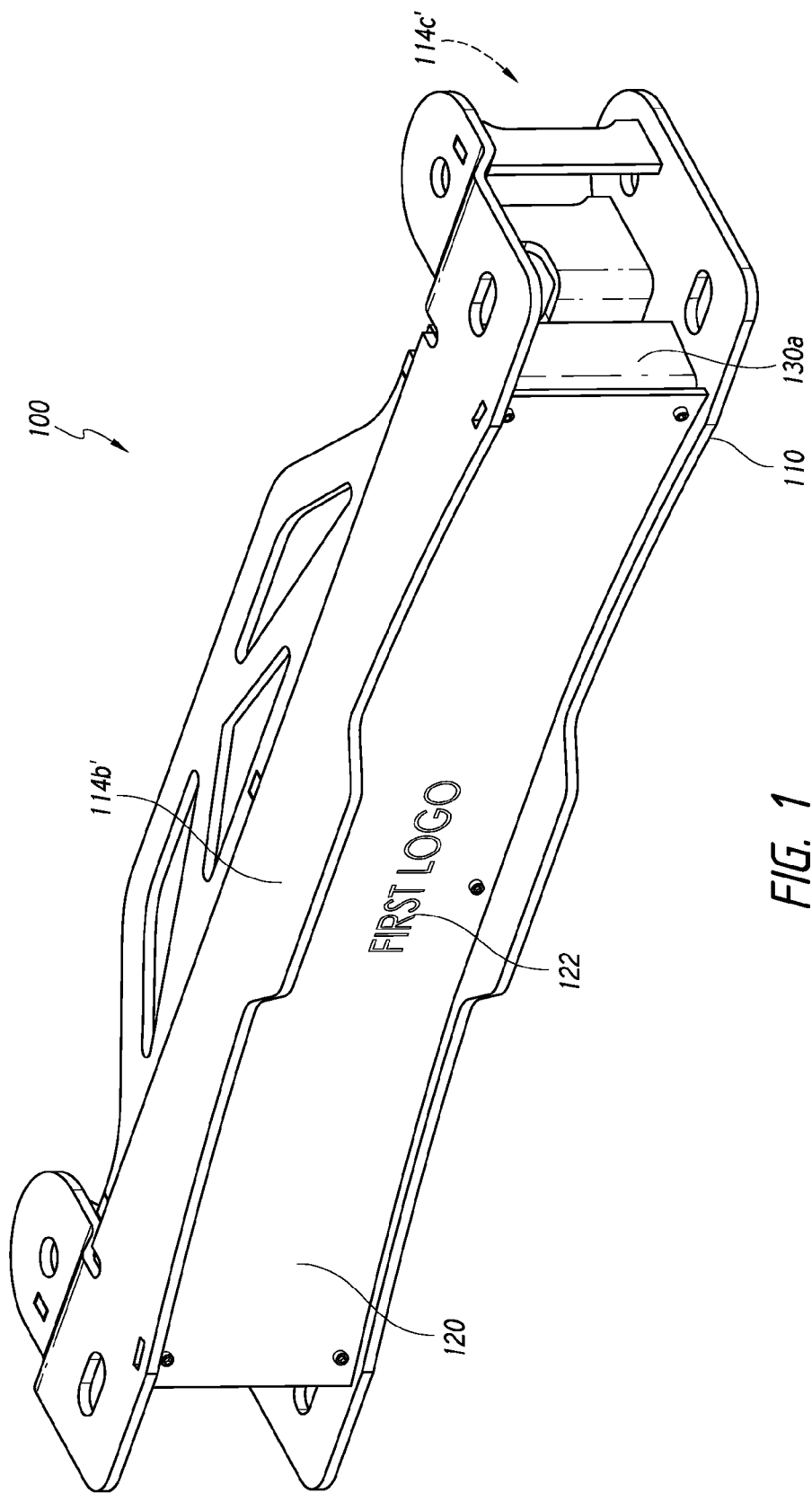
FIGS. 1-3 are bottom perspective views of a first exemplary frame component of an exemplary under-vehicle ground effect system with an exemplary first logo.
Figure 2:
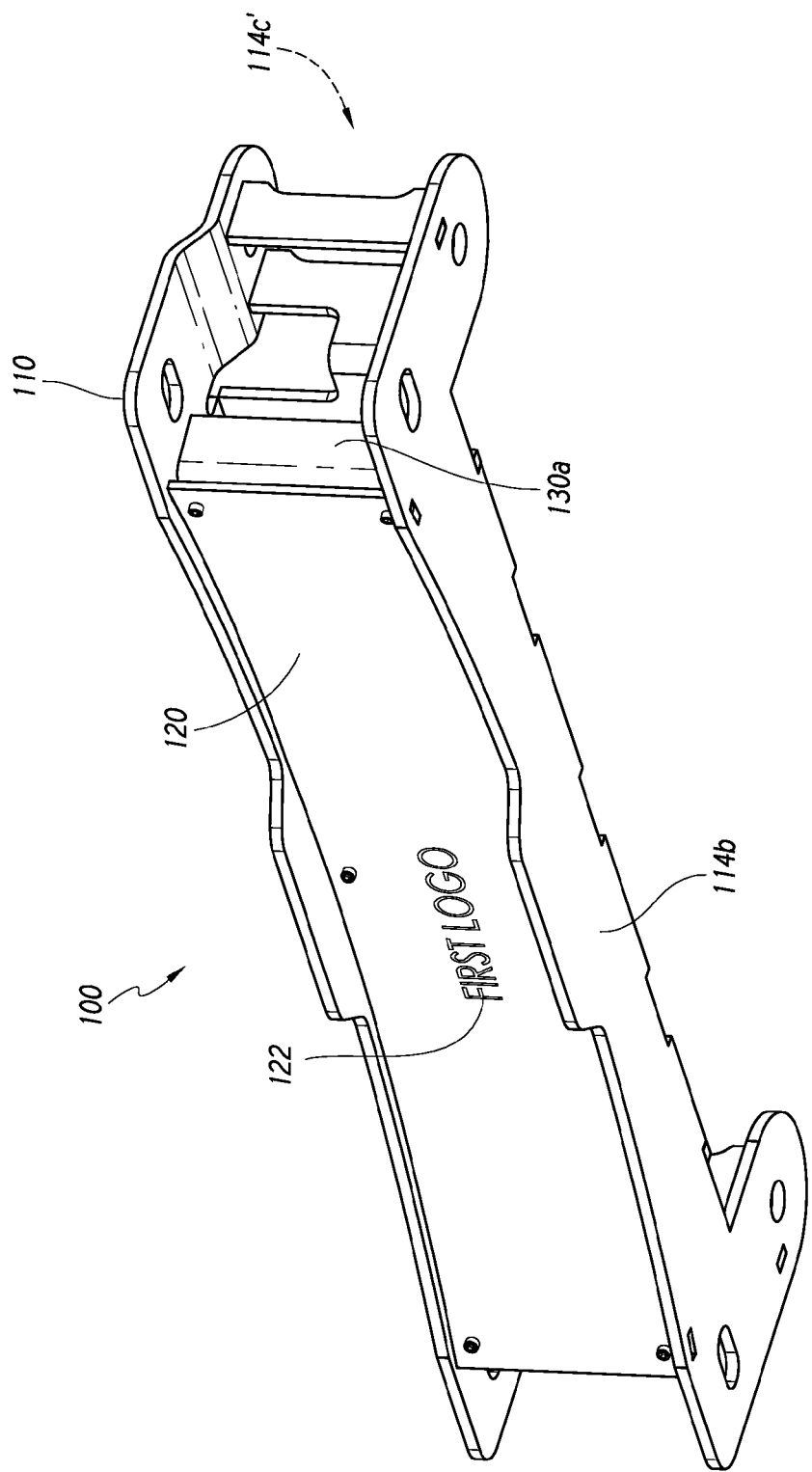
Figure 3:
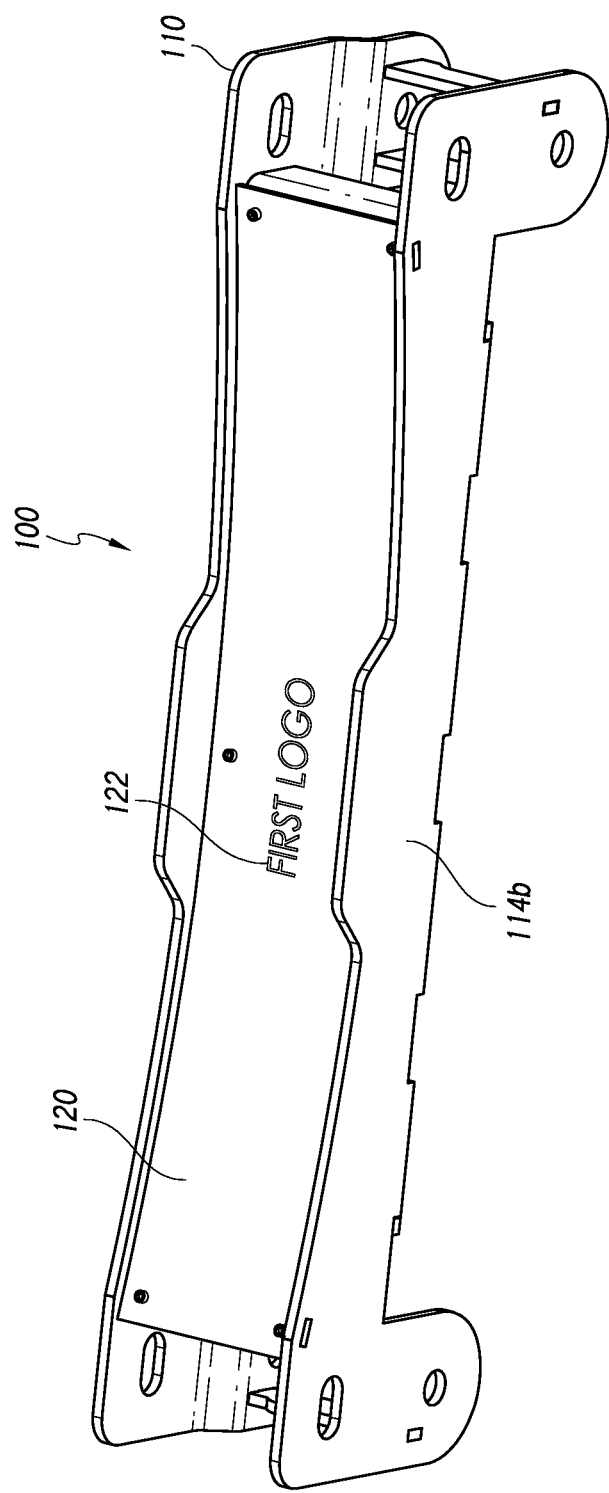
Figure 10:
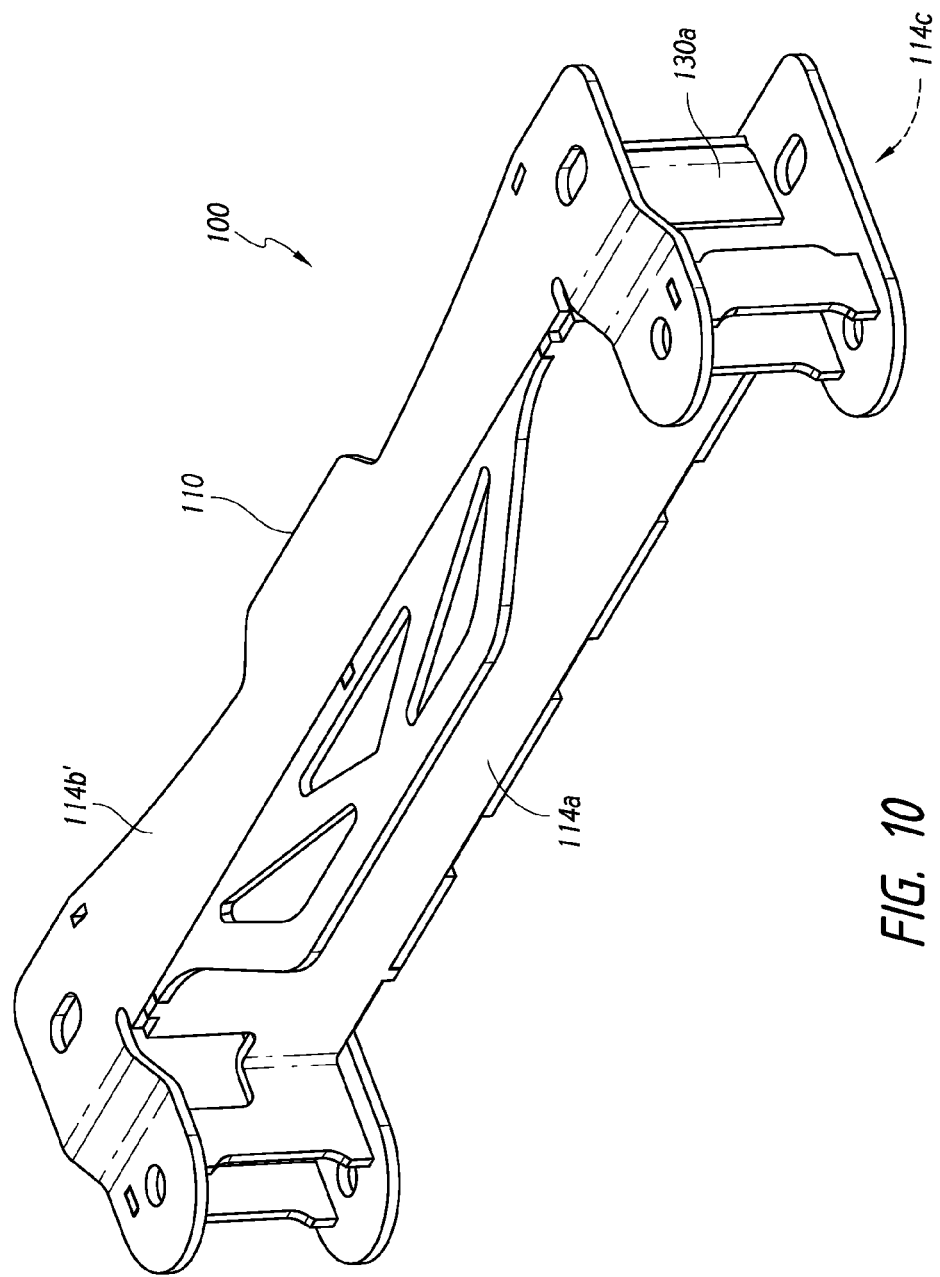
Figure 11:
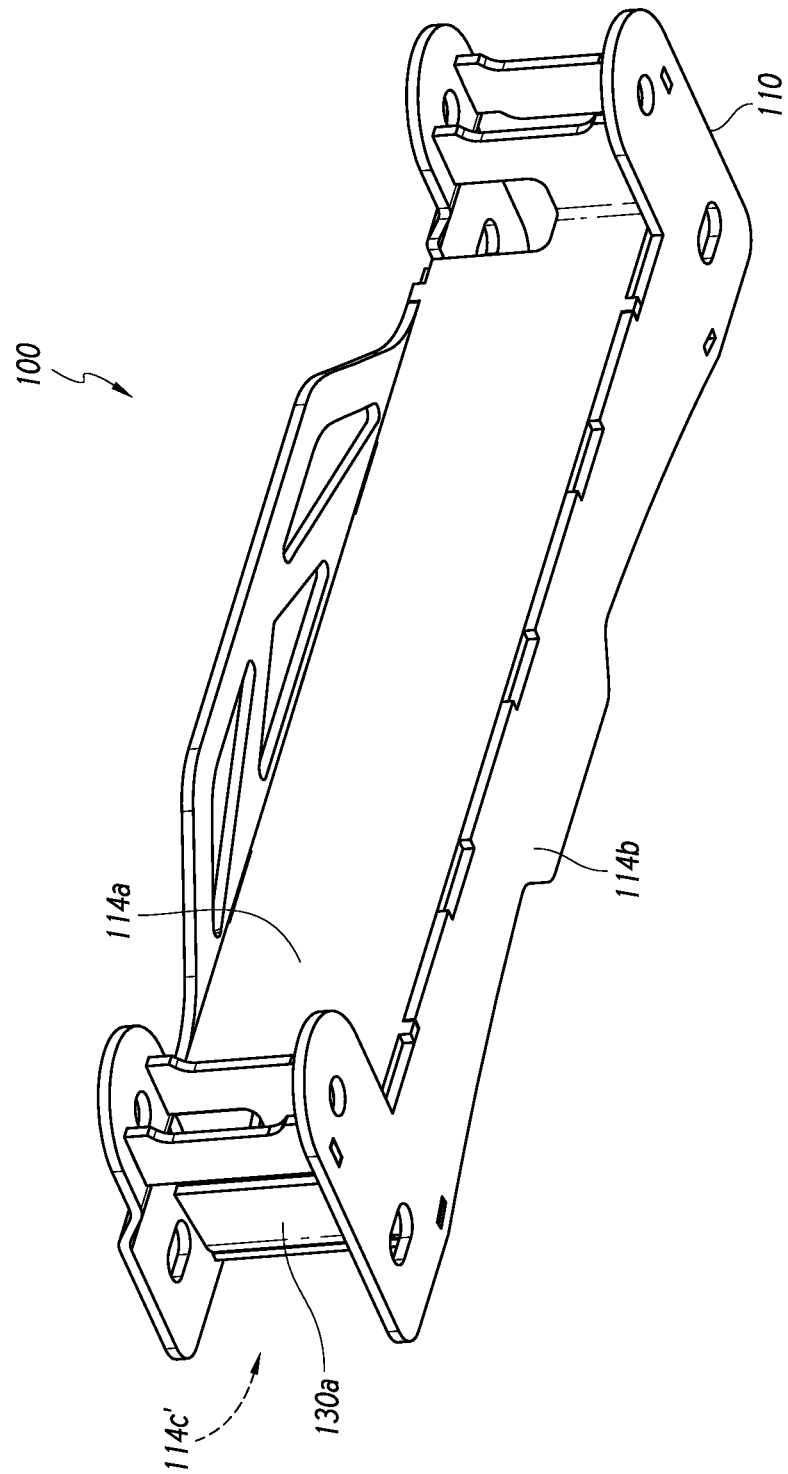
Figure 16:
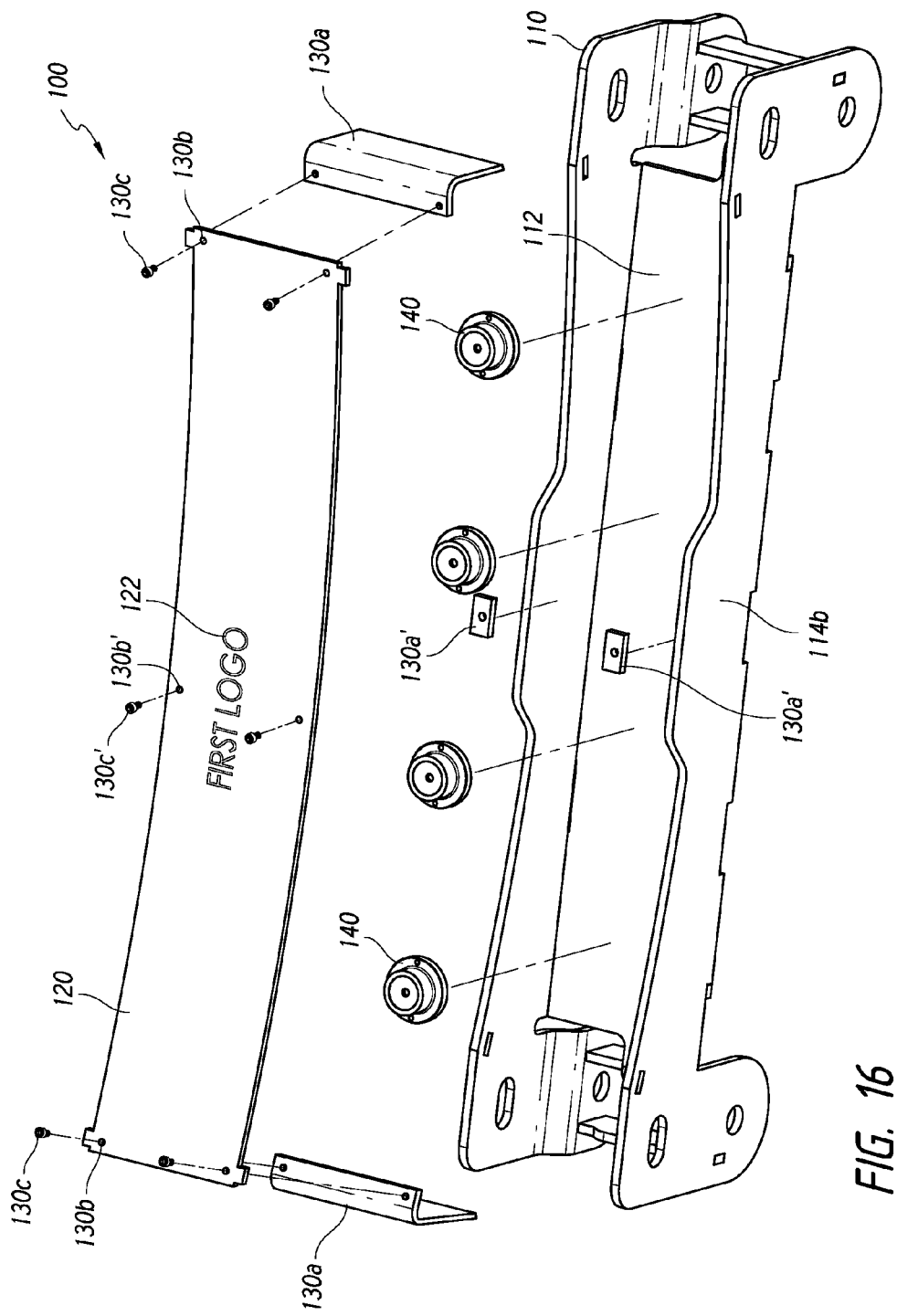
FIG. 16 is an exploded view of the first exemplary frame component and exemplary under-vehicle ground effect system of FIGS. 1-3.
Figure 17:
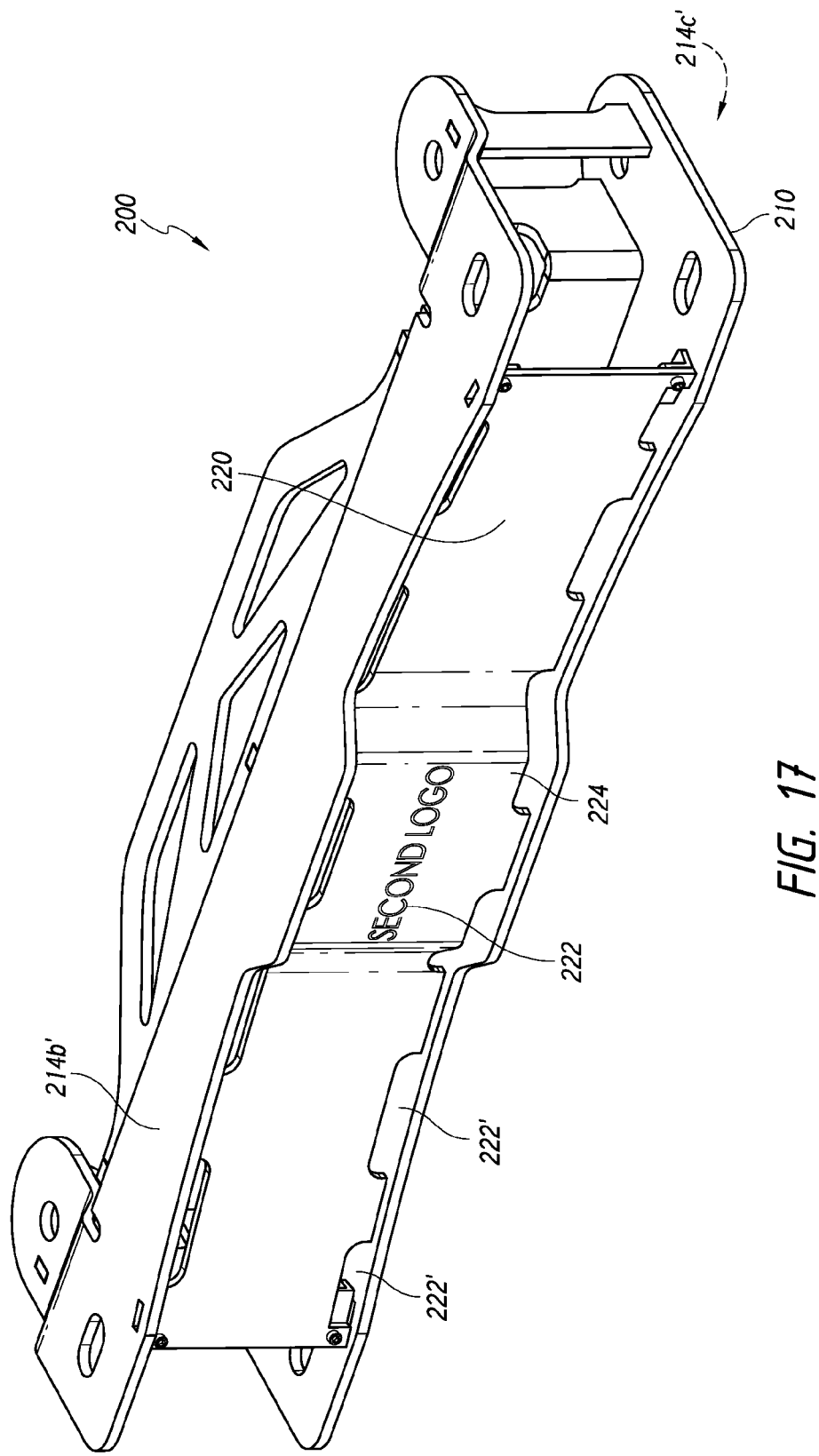
FIGS. 17-19 are bottom perspective views of a first exemplary frame component of an exemplary under-vehicle ground effect system with an exemplary second logo.
Figure 18:
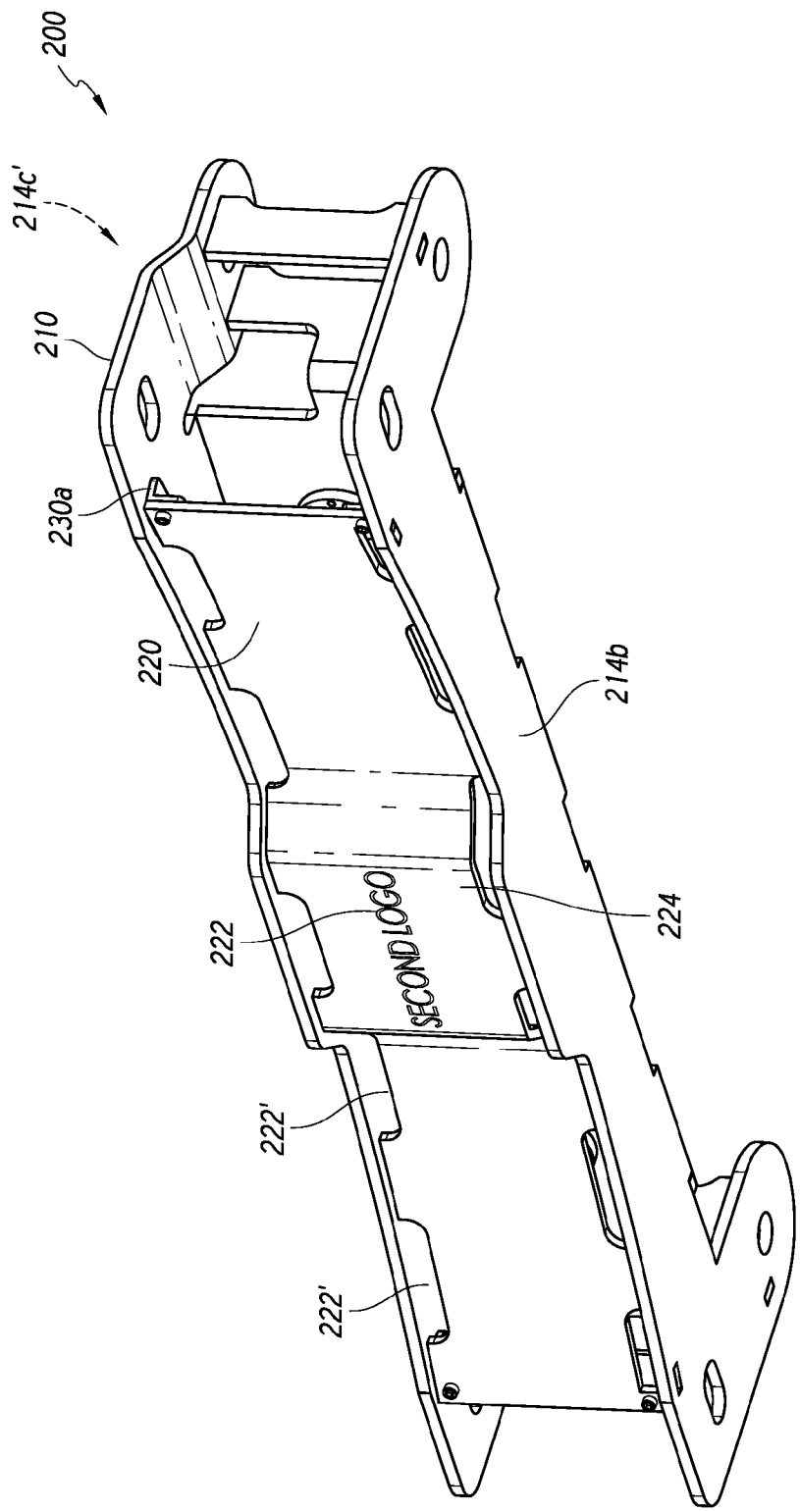
Figure 19:
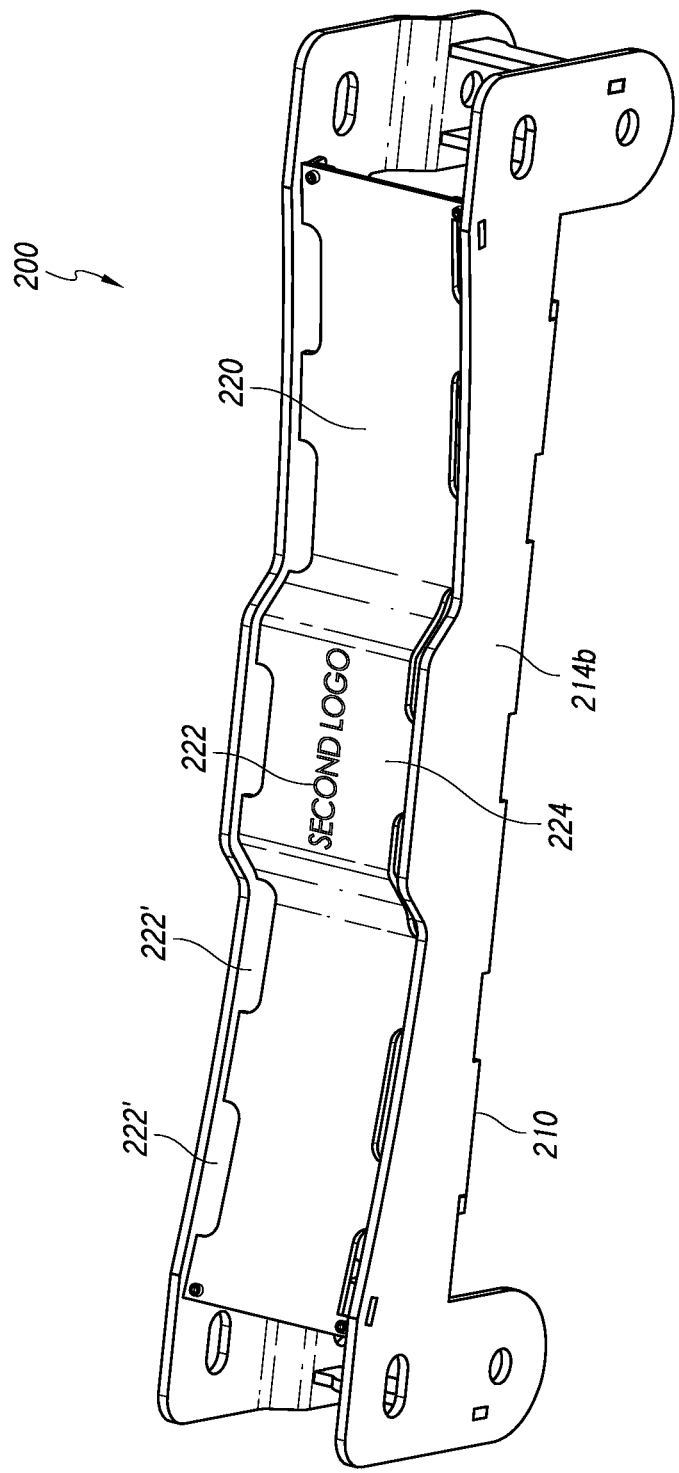
Figure 26:
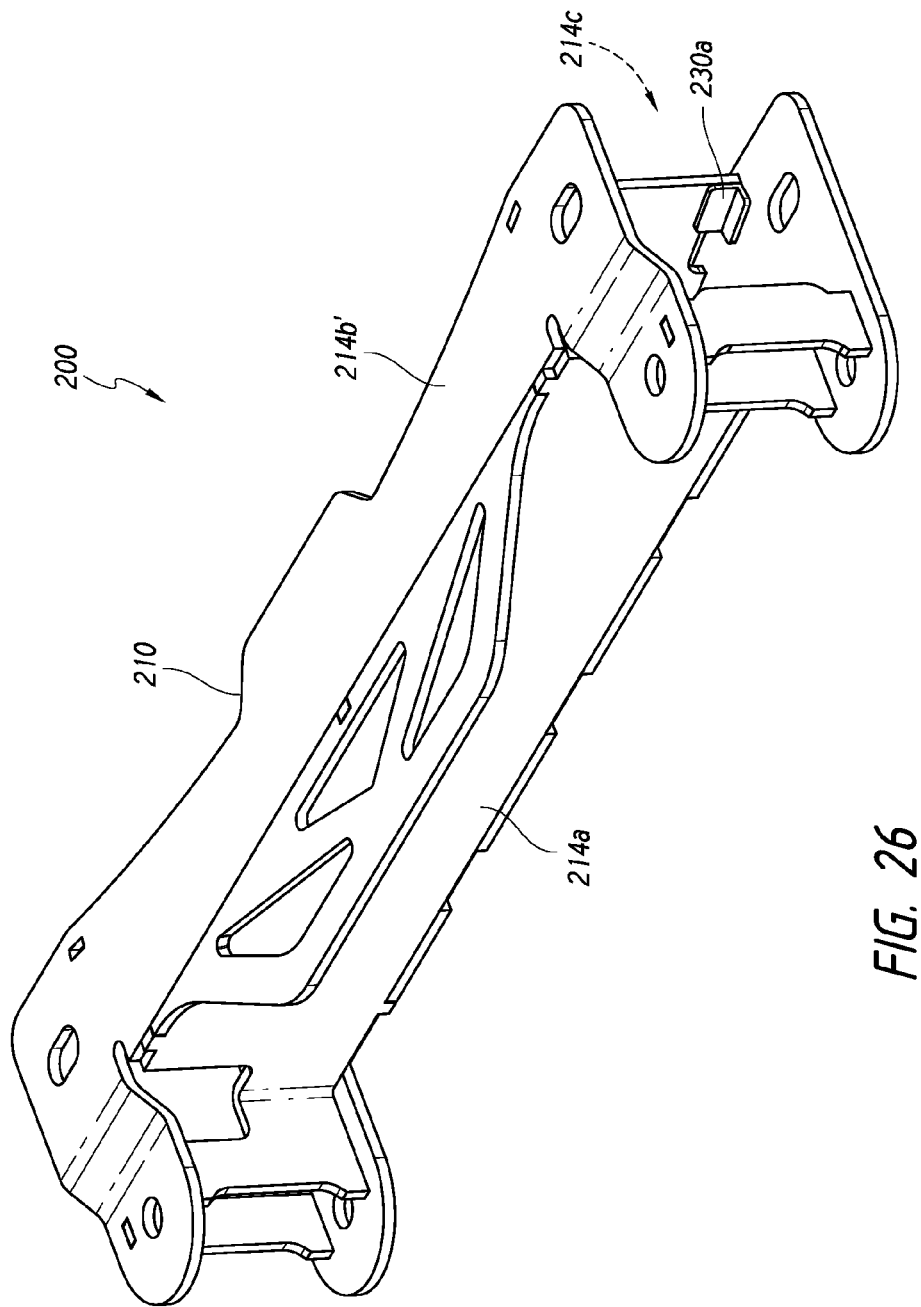
Figure 27:
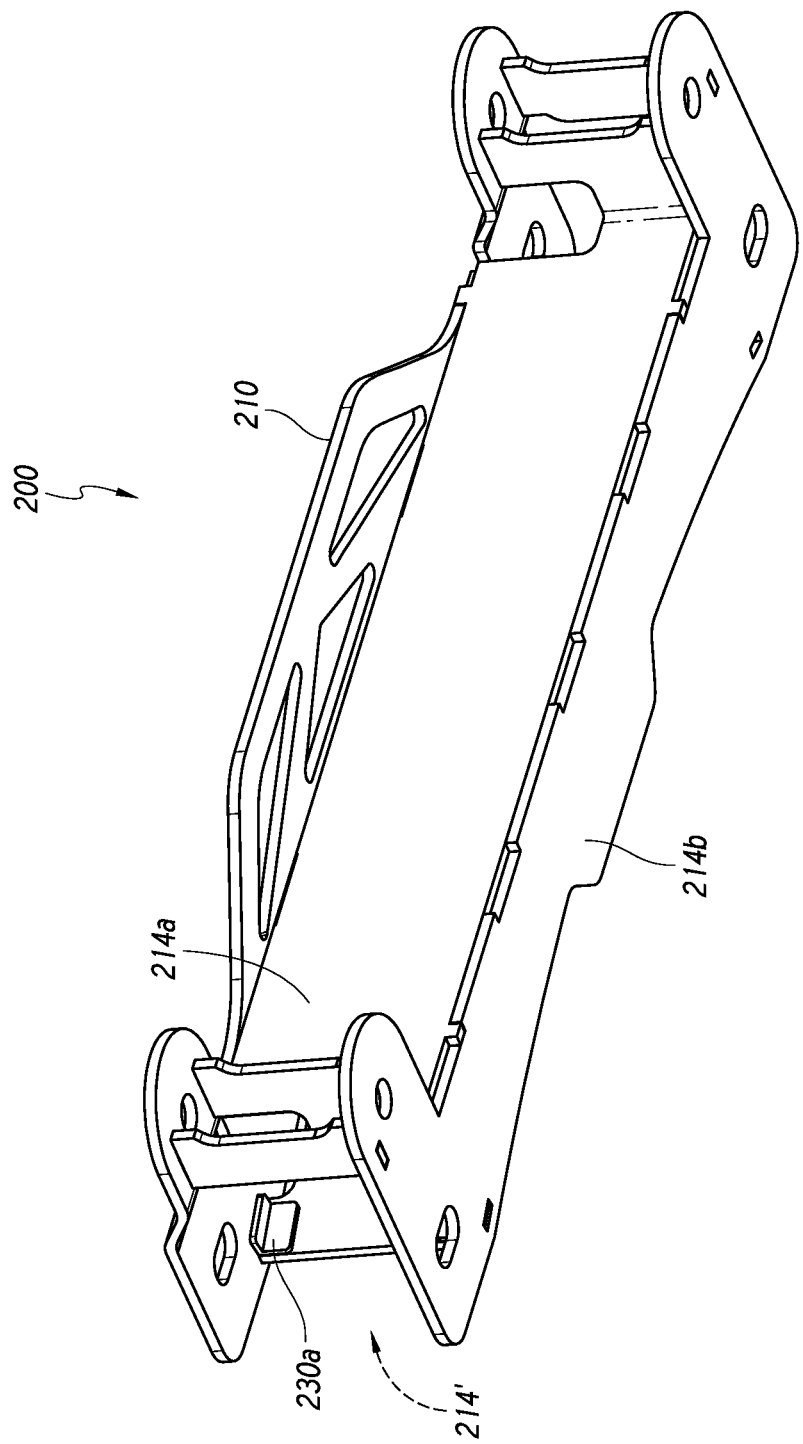

The drawing figures are not necessarily to scale. Certain features or components herein may be shown in somewhat schematic form and some details of conventional elements may not be shown or described in the interest of clarity and conciseness. The drawing figures are hereby incorporated in and constitute a part of this specification.

DETAILED DESCRIPTION OF THE INVENTION

Described herein are under-vehicle ground effect systems 100, 200 that create at least one recognizable image 102, 202, 302. Preferably, the systems are positioned under a vehicle 300 and are incorporated into the vehicle frame 310 (shown as 310a, 310b, 310c, 310d, but referred to generally as 310). Preferably, the systems are incorporated within at least one frame component 110, 210 such as a side rail 320 or a cross member 330. Preferred systems 100, 200 allow for customizability (e.g. by using replaceable face plates 120, 220 with cutouts 122, 222 therein) to facilitate the creation of custom images 102, 202, 302 (e.g. words, numbers, logos, and designs). Preferred systems 100, 200 that create a projected custom image 102, 202 may also allow for customizability of the projection location (e.g. on the ground under or adjacent to the vehicle).

Although the under-vehicle ground effect systems 100, 200 described herein are shown as being incorporated within a cross member 330 shown as the frame component 110, 210, it is contemplated that the systems 100, 200 could be adapted to other frame structures including, but not limited to, the side rails 320. The under-vehicle ground effect systems 100, 200 are particularly suited to being used in association with a cross member because cross members are not only replaceable (as they can be replaced with a cross member is twisted or just worn-out), but car customizers routinely replace cross members in the process of changing the height of the vehicle. "Lift kits" may be purchased for this purpose.

Exemplary under-vehicle ground effect systems 100, 200 may be better understood with reference to the drawings, but these under-vehicle ground effect systems are not intended to be of a limiting nature. The same reference numbers will be used throughout the drawings and description in this document to refer to the same or like parts. Also, the 100 series (primarily referring to FIGS. 1-16) and 200 series (primarily referring to FIGS. 17-32) of numbers refer to similar components of the two examples referred to by the respective series.

DEFINITIONS

Before describing the under-vehicle ground effect systems and the figures, some of the terminology should be clarified. Please note that the terms and phrases may have additional definitions and/or examples throughout the specification. Where otherwise not specifically defined, words, phrases, and acronyms are given their ordinary meaning in the art. The following paragraphs provide some of the definitions for terms and phrases used herein.

The term "chassis" is used to describe the internal structure that supports a vehicle. The phrase "rolling chassis" would be used to describe the combination of the chassis and the running gear (wheels, transmission, etc.).

Figure 33:
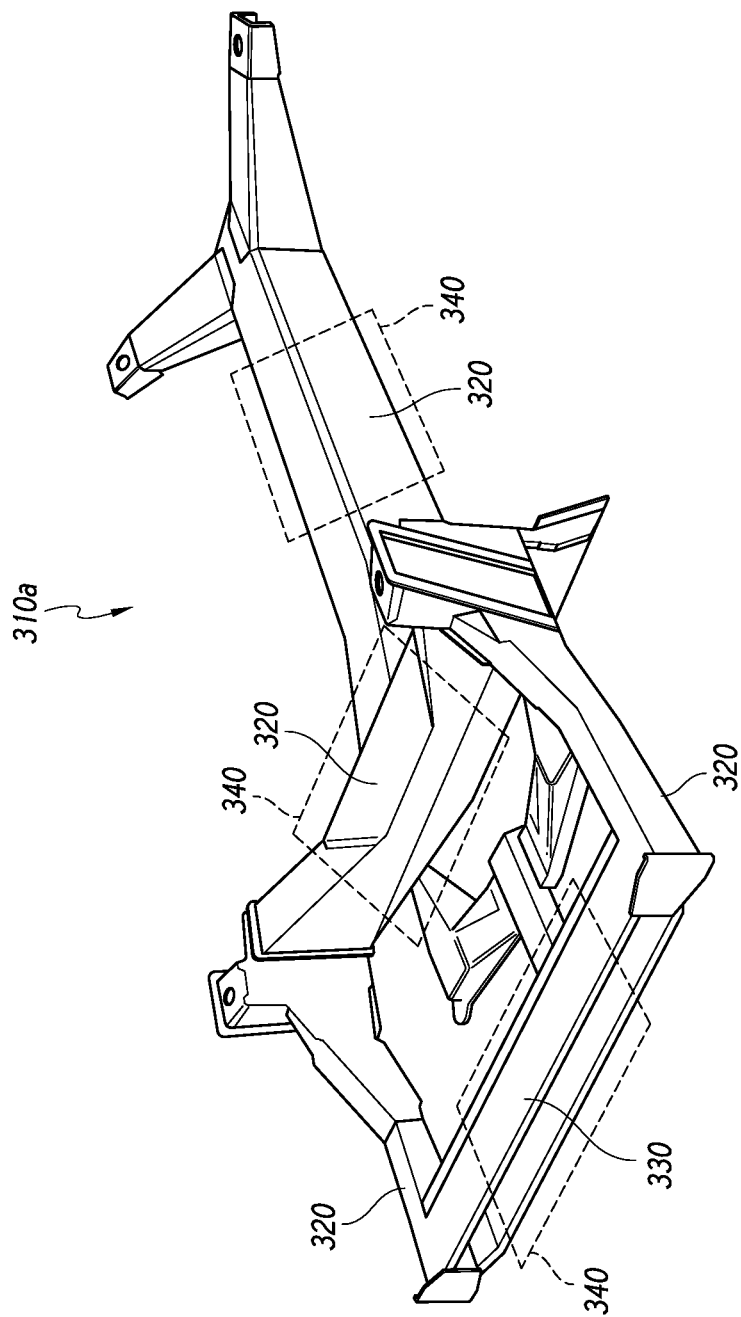
Figure 34:
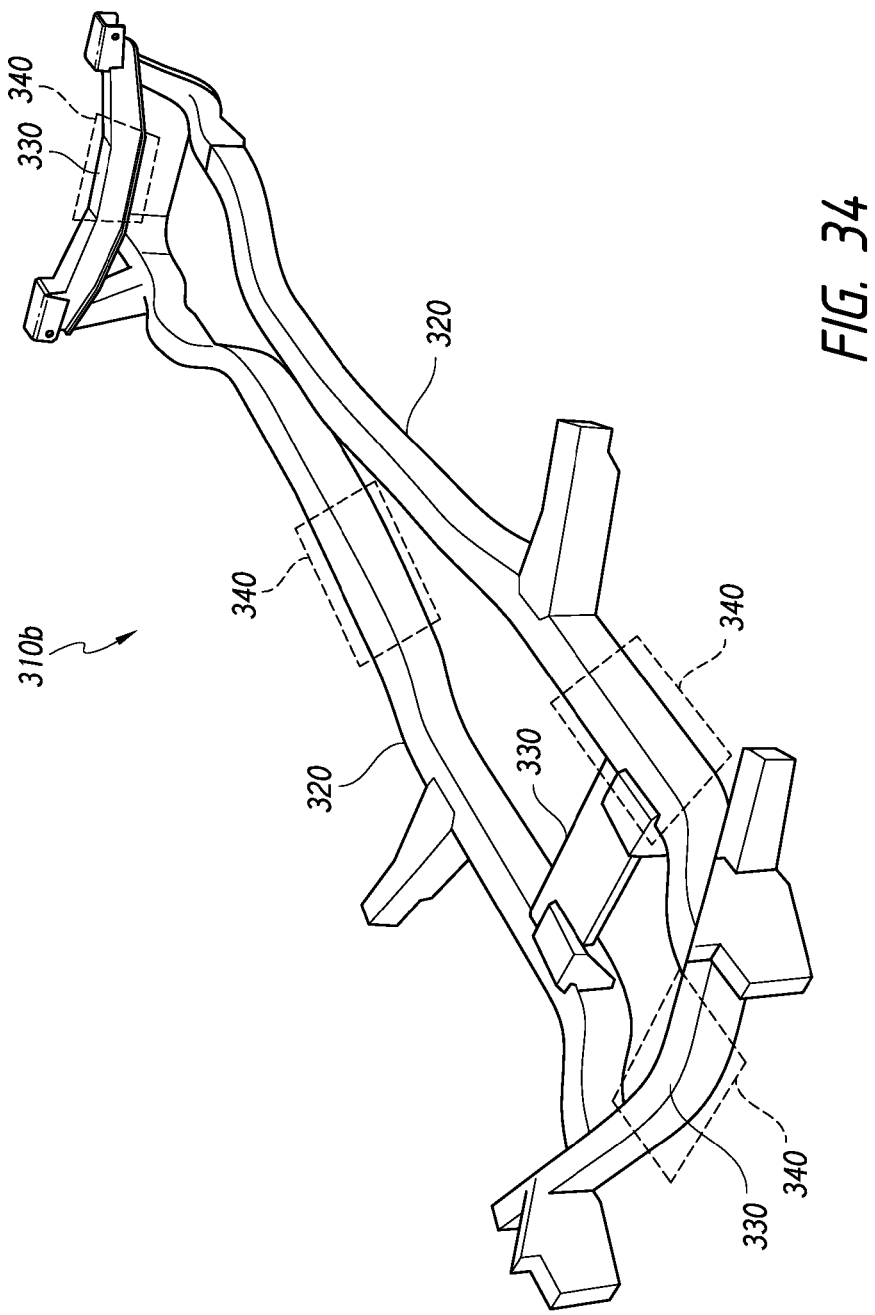
Figure 35:
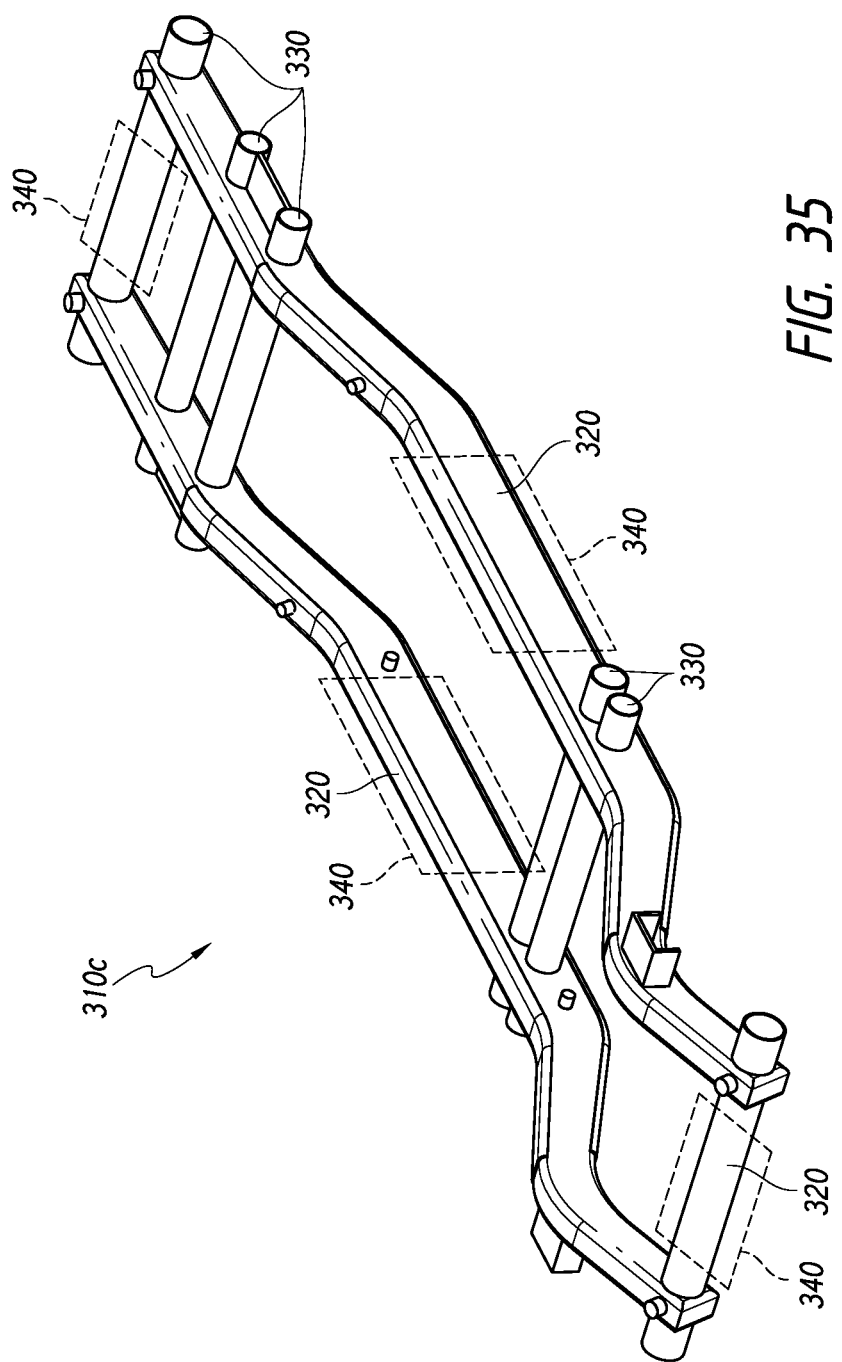

The term "frame" 310 is used to describe the structure portion of the chassis that includes the side rails 320, the cross members 330, and connecting joints and structure therebetween. Exemplary vehicle frames 310 are shown as 310a (FIG. 33), 310b (FIG. 34), 310c (FIG. 35), 310d (FIG. 36) and referred to generally herein as frame 310. All the components of the frame 310 are referred to herein generically as "frame components" 110, 210. Although the shown frame components 110, 210 are cross members 330, this is not meant to be limiting. All the other components of the vehicle fasten to the frame. A typical frame 310 has a single rail 320 or two substantially parallel side rails 320. A single rail (backbone) frame has a single main rail and front and rear suspension attachment areas (that would be used in place of cross members). FIG. 33 shows an exemplary single rail frame. A double rail frame (e.g. a ladder frame) has a plurality of cross members (rungs). FIGS. 34 and 35 show exemplary double rail frames. Ladder frames are found in most pre-1940's cars and most trucks. Additional frames include, but are not limited to, perimeter frames (an example of which is shown in FIG. 36), X-frames, platform frames, superleggera frames, unibody frames (which might include at least one sub-frame section, stub frame section, or boxed frame section). Additional exemplary frames are shown in patents including, but not limited to, U.S. Pat. No. 1,638,948 to Masury et al., U.S. Pat. No. 3,614,124 to Schwabenlender, U.S. Pat. No. 5,308,115 to Ruehl et al., and U.S. Pat. No. 8,002,064 to Yamada et, al. It should be noted that these examples are not meant to be limiting and other frames known or yet to be discovered are specifically included in this definition. In fact, most makes and/or manufactures of cars have their own unique frame with their own unique frame components. It is to be understood that each of these frame components could be adapted to include the under-vehicle ground effect systems 100, 200 described herein and/or could be replaced with replacement frame components (that may be custom made) that include the under-vehicle ground effect systems 100, 200 described herein.

The term "rail" 320 is used to describe one or more structures of the frame 310 that at least partially spans the length of the vehicle. As described herein, rails are frame components. A typical frame has a single rail 320 or two substantially parallel side rails 320 that extend(s) substantially (e.g. more than 50%) the length of the vehicle 300. Alternative frames (e.g. the perimeter frame of FIG. 36) may have shorter rails or a plurality of rails that together substantially span the length of the vehicle. The rails 320 are generally hollow (e.g. a closed channel), C-shaped, or U-shaped.

The phrase "cross member" 330 is used to describe the portion of the frame 310 that acts as a strengthening beam to give the side rails torsional (twisting or wrenching) strength. As described herein, a cross member 330 is a frame component. Cross members 330 typically are positioned and secured at an angle (e.g. perpendicular) to the at least one rail 320. The cross member generally improves the rigidity of the vehicle body. The cross members also often carry the weight of the engine and/or transmission. The cross members 330 are generally hollow (e.g. a closed channel), C-shaped, or U-shaped.

The term "body" and the phrase "vehicle body" are used to describe the external (skin) structure of a vehicle. A unibody construction combines the frame and the body into a single or integral unit.

The phrase "light source" is used to describe a source of light positioned with the frame components 110, 210. Light sources may be backlighting light sources and/or projecting light sources. Backlighting light sources may, for example, cause a logo cutout 122, 222 in a bottom face plate 120, 220 to be illuminated from behind (within the interior compartment 112, 212). In some cases, backlighting light sources may be positioned around the outer edges of the interior compartment 112, 212. A backlit image (see FIG. 41) might be desirable if the car is to be viewed from beneath (e.g. when the car is located on a see-through floor or when a car is displayed raised or at an angle). Projecting light sources may, for example, create a projected custom image 102, 202 on a surface under or adjacent to the vehicle. Some light sources may function as either a backlighting light source or a projecting light source allowing a user to selectively choose a light source mode (e.g. using a controller) or allowing the situation to dictate the light source mode (e.g. using sensors). Some light sources may function as both a backlighting light source and a projecting light source. For example, the "projecting" may just be a byproduct of the backlighting. An advantage of a dual backlighting/projecting light source is that the image will be viewable at all angles and from all vantages. The light source is able to withstand the rigors that components underneath a vehicle would face including, but not limited to, road debris, weather (including extreme temperatures), fluid (both from the terrain and from the vehicle itself), and other known dangers. One exemplary light source is the ORACLE LED Spot Light Pod. Other possible light sources include, but are not limited to, those described in U.S. Pat. No. 6,392,559 to Sharpe, Jr., U.S. Pat. No. 7,413,329 to Salazar, and U.S. Pat. No. 8,608,356 to McGean. Still other possible light sources are described in other patents set forth herein. The specific light source would be designed to withstand the rigors intended for the specific vehicle (e.g. an off road vehicle may require a particularly durable light source).

Figure 30:
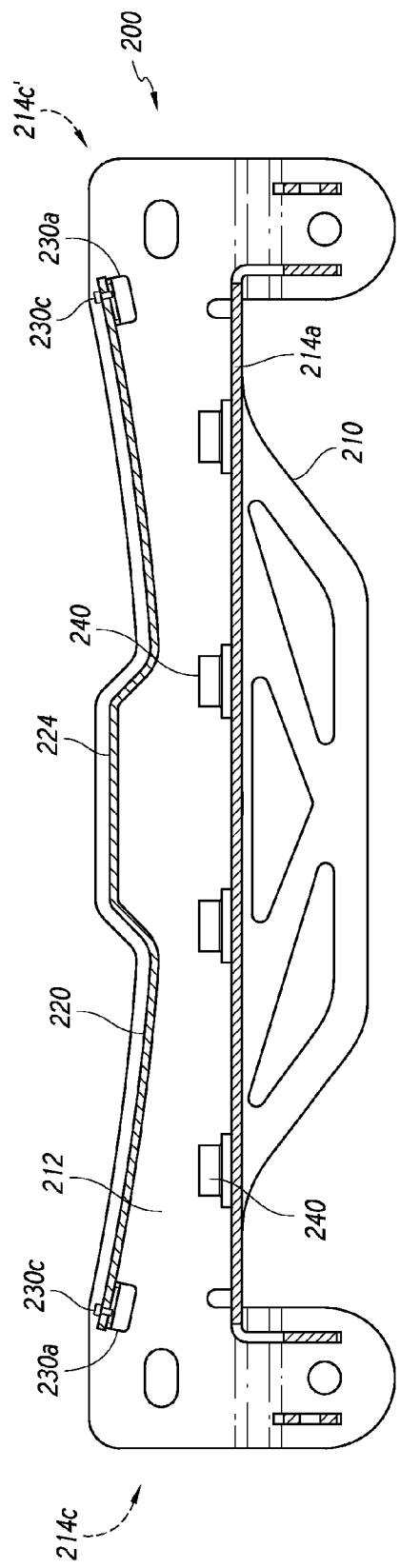
FIG. 30 is a cross sectional view of the second exemplary frame component and exemplary under-vehicle ground effect system of FIG. 20 taken along the line 30-30.
Figure 31:
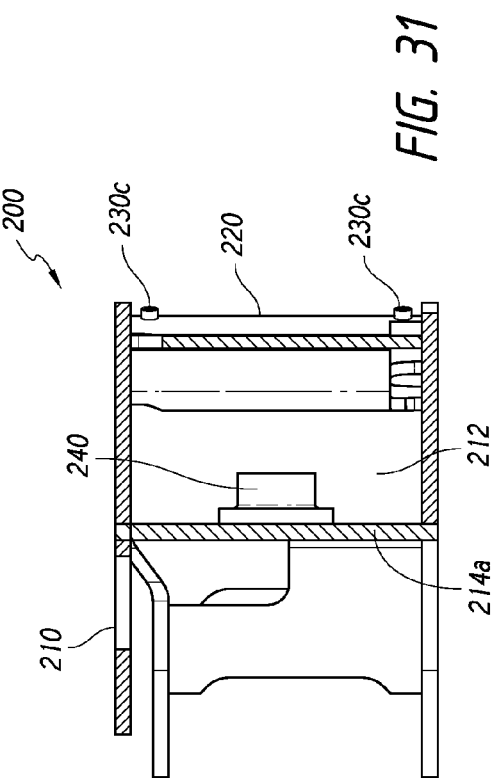
FIG. 31 is a cross sectional view of the second exemplary frame component and exemplary under-vehicle ground effect system of FIG. 20 taken along the line 31-31.
Figure 32:
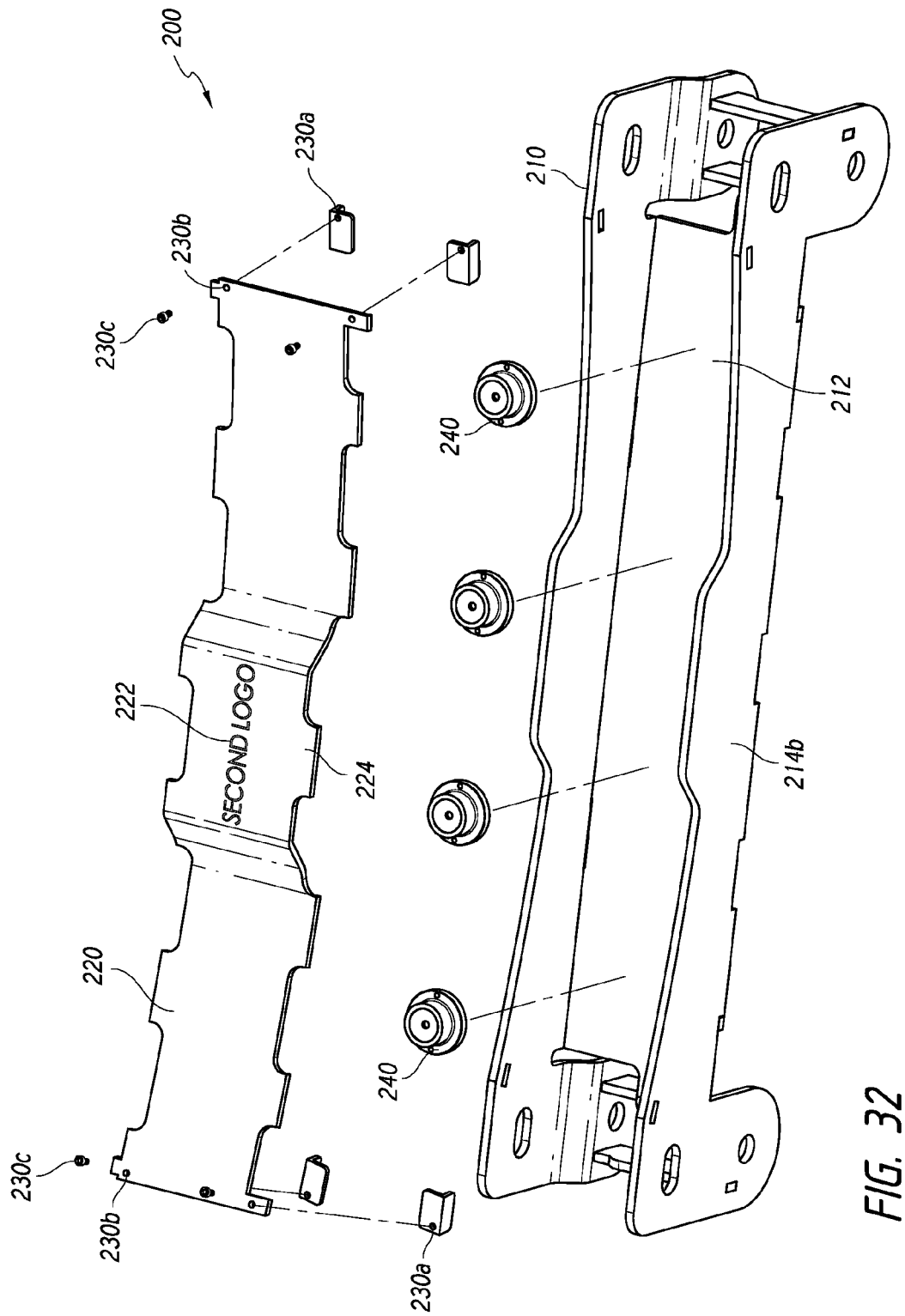
FIG. 32 is an exploded view of the second exemplary frame component and exemplary under-vehicle ground effect system of FIGS. 17-19.

The terms "parallel" and "perpendicular" are meant to be general or relative terms and not necessarily meant to be exact to mathematical standards. For example, the top face 114a, 214a and bottom face plates 120, 220 shown in FIGS. 14 and 30 are "parallel" for purposes of the structural body 114, 214 described herein. Similarly, even if a front face and a back face are concave or convex, they are "parallel" for purposes of the structural body described herein. If the structural body is C-shaped or U-shaped, the fact that there is not an exact corner would not detract from the fact that the front face and back face would be considered perpendicular to the top face.

The phrase "lift kit" is used to describe kits for purchase that may be used to change or enhance vehicle suspensions for purposes such as customizing the original suspension based on the driver's needs and desires for factors including, but not limited to, specific work (on-road) needs, specific play needs (off-road), specific towing needs, particular appearance (height), particular type of drivability (e.g. control, suspension articulation, flexibility), accommodation of the vehicle itself other car components (e.g. particular tires, shock absorbers, and/or torsion bars), and many other factors. Exemplary lift kits can be purchased that are designed for adjusting independent front and/or rear suspension. Lift kits can be "generic" in that they fit many types of vehicles, but most lift kits are customized (or customizable) for a specific make and/or model of vehicle. Some of the original (or stock) components of the vehicle may be used along with items in the kit. The under-vehicle ground effect systems 100, 200 may be associated with a lift kit.

The term "associated" is defined to mean integral or original, retrofitted, attached, connected (including functionally connected), positioned near, and/or accessible by. "Associated" is also meant to include "integratable" and/or "usable with." For example, under-vehicle ground effect systems 100, 200 that are associated with a lift kit may be integrated with (able to be used with) the components of the lift kit. The under-vehicle ground effect systems 100, 200 may be sold as part of the lift kit. Another example is that a frame component 110, 210 is associated with a vehicle frame 310 in that the frame component 110, 210 may be attached or connected to the all or part of the remainder of the vehicle frame 310.

It should be noted that relative terms (e.g. primary and secondary) are meant to help in the understanding of the technology and are not meant to limit the scope of the invention. Similarly, unless specifically stated otherwise, the numerical designation terms such as "first," "second," "third," and "fourth" are meant solely for purposes of designation and not for order or limitation. For example, the "first exemplary logo" has no order relationship with the "second exemplary logo."

It should be noted that some terms used in this specification are meant to be relative. For example, the term "top" (used herein in relation to the cross member) is meant to be relative to the term "bottom" (used herein in relation to the cross member). Similarly, the term "front" is meant to be relative to the term "back." Rotation of the system or component that would change the designation might change the terminology, but not the concept.

The terms "may," "might," "can," and "could" are used to indicate alternatives and optional features and only should be construed as a limitation if specifically included in the claims.

Unless specifically stated otherwise, the term "exemplary" is meant to indicate an example, representative, and/or illustration of a type. The term "exemplary" does not necessarily mean the best or most desired of the type.

It should be noted that, unless otherwise specified, the term "or" is used in its nonexclusive form (e.g. "A or B" includes A, B, A and B, or any combination thereof, but it would not have to include all of these possibilities). It should be noted that, unless otherwise specified, "and/or" is used similarly (e.g. "A and/or B" includes A, B, A and B, or any combination thereof, but it would not have to include all of these possibilities). It should be noted that, unless otherwise specified, the terms "includes" and "has" mean "comprises" (e.g. a device that includes, has, or comprises A and B, contains A and B, but optionally may contain C or additional components other than A and B). It should be noted that, unless otherwise specified, the singular forms "a," "an," and "the" refer to one or more than one, unless the context clearly dictates otherwise.

Exemplary under-vehicle ground effect systems are shown as 100 series in FIGS. 1-16 and 200 series in 17-32. These systems have many similarities to each other and to the other under-vehicle ground effect systems that they represent. For example, using the under-vehicle ground effect systems 100, 200 as exhibits so as to facilitate the understanding of the under-vehicle ground effect systems, the under-vehicle ground effect systems 100, 200 include a frame component 110, 210. The frame component 110, 210 preferably substantially encloses at least one interior compartment 112, 212. The compartment 112, 212 is "substantially" enclosed in that it does not need to be, and most likely is not, watertight. There may be openings in the frame component 110, 210 that allow wires, air, light, and/or small amounts of debris to pass. Positioned within the compartment 112, 212 is a light source.

Although the under-vehicle ground effect systems 100, 200 described herein are shown as being incorporated within a cross member 330, the cross member is used to represent all frame components 110, 210. The system 100, 200 is preferably adaptable to other frame structure including, but not limited to, the side rails 320. Put another way, the system may be incorporated within at least one frame component 110, 210 (e.g. a side rail 320 or a cross member 330). Exemplary vehicle frames 310 are shown as 310a (FIG. 33), 310b (FIG. 34), 310c (FIG. 35), 310d (FIG. 36). As set forth herein, these frames are meant to show examples of frames, but most vehicle makes and models have their own specific frame components. FIGS. 33-36 also show exemplary possible locations in which the under-vehicle ground effect systems 100, 200 could be positioned. These locations are designated roughly by phantom boxes 340. It should be noted, however, that the locations are only meant to be examples of possible locations. Not all possible locations are designated by the phantom boxes 340. Locations may be anywhere along the length of the rails 320 or the cross members 330 with the structural body 114, 214 taking the place of (or being the modified version of) all or part of the portion of the stock vehicle frame 310.

The frame component 110, 210 preferably includes a structural body 114, 214 and a bottom replaceable face plate 120, 220.

The structural body preferably includes a top face 114a, 214a, a front face 114b, 214b, and a back face 114b', 214b'. In the shown exemplary structural body the front face 114b, 214b is substantially parallel to the back face 114b', 214b', and the top face 114a, 214a at least substantially spans the distance therebetween. The structural body may also include two end faces (not specifically shown, but in the general area of 114c, 114c', 214c, 214c'). The replaceable bottom face plate supports (shown as brackets 130a) may also function as end faces in that they at least partially block light. The top, front, and back faces 114a, 214a, 114b, 214b, 114b', 214b' may be the "walls" of a "U-shape" or a "C-shape" such that there is not a clear distinction between the individual faces. The top, front, and back faces 114a, 214a, 114b, 214b, 114b', 214b' may be flat, curved (concave or convex), or have irregular planes. The faces of the structural body (e.g. the top, front, back, and/or optional end faces) may also be jointly referred to as the cross-member structural faces 114, 214 (which is equivalent to the structural body 114, 214). Although shown as distinct elements, multiple cross-member structural faces 114, 214 may be a single component that functions as a distinct element. For example, the top, front, and back faces 114a, 214a, 114b, 214b, 114b', 214b' may be a unified component such as three "sides" of a single sheet of metal that has two folds (or less distinct bends that form a "C" or "U" shape) therein that divide the metal into distinct (or, in the case of bends, at least reasonably distinguishable "sides"). The cross-member structural faces 114, 214 may be strictly functional or they may include ornamental features. These cross-member structural faces 114, 214 may be solid or may have relatively small apertures therein (e.g. apertures to allow wires therethrough and/or to allow desired light therethrough). The structural body 114, 214 may be a standard (stock) frame component in that it may be an off-the-shelf frame component made by an original equipment manufacturer (OEM) or an aftermarket replacement part (e.g. part of known lift kits). Alternatively, the structural body 114, 214 may be a custom frame component made specifically for the purpose of creating the under-vehicle ground effect systems 100, 200. The structural body 114, 214 is preferably suitable for functioning as the original component 310 of the frame 310 that the frame component 110, 210 of the under-vehicle ground effect systems 100, 200 is replacing with, or without, the bottom replaceable face plates 120, 220 being secured thereto.

The bottom replaceable face plates 120, 220 are meant to substantially enclose or cover the interior compartment 112, 212 created between the top face 114a, 214a, the front face 114b, 214b, and the back face 114b', 214b' and, if present, the end faces 114c, 114c', 214c, 214c'. The exemplary bottom replaceable face plate 120 shown in FIGS. 1-16 is a relatively plain slightly arced face plate without significant ornamentation that has a centered cutout 122. The exemplary bottom replaceable face plate 220 shown in FIGS. 17-32 is a relatively more ornamented, slightly arced face plate with a raised center section 224 that has a centered cutout 222 and longitudinal edge cutouts 222'. Although arced or having certain raised sections, in the shown exemplary structural body the replaceable bottom face plates 120, 220 are substantially parallel to the top face 114a, 214a.

The bottom replaceable face plates 120, 220 have cutouts 122, 222 defined therein. (The plural "cutouts" is used throughout in that most of the desired images would have multiple parts (e.g. multiple letters), however, the plural term should be interpreted to include the possibility of a singular cutout (e.g. a stylized cursive word that has only one actual cutout).) The replaceable face plates 120, 220 with the cutouts 122, 222 can be considered to be "stencils" through which light may shine as backlighting and/or projection lighting. The cutout 122 shown in FIGS. 1-16 is shown as the words "FIRST LOGO" which could be backlit to create a backlit image of "FIRST LOGO" or light could be shined through to create a projected image of "FIRST LOGO" on a surface below or adjacent to a vehicle. The cutout 222 shown in FIGS. 17-32 is shown as the words "SECOND LOGO" which could be backlit to create a backlit image of "SECOND LOGO" or light could be shined through to create a projected image of "SECOND LOGO" on a surface below or adjacent to a vehicle. The exemplary cutouts 122, 222 are meant to be exemplary and could easily be a different type of cutout including numbers (e.g. a phone number), logos (e.g. a trademarked logo), and/or designs (e.g. a geometric pattern or the image of a vehicle, flower, or other recognizable image). The size and relative position (e.g. centered, left justified, right justified) are meant to be exemplary and are not meant to limit the scope of the invention.

The bottom replaceable face plates 120, 220 and the cutouts 122, 222 defined therein may be made using known manufacturing techniques including, but not limited to, die cutting, molding, water jet cutting, laser cutting, milling, or any other manufacturing method known or yet to be discovered.

Preferred under-vehicle ground effect systems 100, 200 are customizable because they use replaceable bottom face plates 120, 220 with cutouts 122, 222. A user could purchase multiple bottom face plates 120, 220, each with its own unique cutout 122, 222 (bottom face plates 120, 220 may be custom ordered to the user's specification). The user can easily swap one bottom face plate 120, 220 for another bottom face plate 120, 220. This is facilitated by a secure connector 130, 230 that allows the user to secure a bottom face plate 120, 220 to the structural body 114, 214. Although secure, the attachment is not permanent. In fact, the secure attachment is meant to be temporary such that replacement is possible. Preferred secure connectors may be removed using standard tools readily available to a mechanic or ordinary car enthusiast.

FIGS. 1-16 (and FIGS. 14-16 in particular) show a first exemplary three-part secure connector 130 (shown as 130a, 130b, and 130c). There may be multiple three-part secure connectors 130 for each under-vehicle ground effect system 100. For example, in this under-vehicle ground effect system 100 there is a three-part secure connector 130 at each end of the structural body 114. The three-part secure connector 130 is shown as including a structural body connection part 130a, a bottom face plate connection part 130b, and a joining connection part 130c. The structural body connection part 130a is the part of the secure connector 130 associated (e.g. welded, bolted, riveted, fabricated, bent, or formed) with the structural body 114. In this under-vehicle ground effect system 100, the structural body connection part 130a is shown as a bracket with at least one aperture, the longitudinal length of the bracket being perpendicular to the longitudinal length of the structural body 114. In this position, at least part of the bracket functions as an end face 114c, 114c' in that it blocks light. The bottom face plate connection part 130b is the part of the secure connector 130 associated (e.g. integral) with the bottom face plate 120. In this under-vehicle ground effect system 100, the bottom face plate connection part 130b is shown as at least one aperture bored through the bottom face plate 120, the aperture(s) in the bottom face plate 120 being substantially coextensive (overlapping) with the respective aperture(s) of the bracket. The joining connection part 130c is the connector or joiner of the structural body connection part 130a and the bottom face plate connection part 130b. The shown joining connection part 130c is at least one bolt that may be threaded through the coextensive aperture(s). There may also be additional three-part secure connectors 130' along the longitudinal length of the structural body 114 (e.g. along the front face 114*b* and back face 114*b'*). The three-part secure connectors 130' are shown as including a structural body connection part 130*a'* (shown as a side bracket), a bottom face plate connection part 130*b'* (shown as an aperture), and a joining connection part 130*c'* (shown as a bolt). It should be noted that alternative secure connectors 130, 130' may be variations of the shown structure including, but not limited to, using alternative joining connection parts 130*c*, 130*c'*.

FIGS. 17-32 (and FIGS. 30-32 in particular) show a second exemplary three-part secure connector 230 (shown as 230*a*, 230*b*, and 230*c*). There may be multiple three-part secure connectors 230 for each under-vehicle ground effect system 200. For example, in this under-vehicle ground effect system 200 there is a three-part secure connector 230 at each end of the structural body 214. The three-part secure connector 230 is shown as including a structural body connection part 230*a*, a bottom face plate connection part 230*b*, and a joining connection part 230*c*. The structural body connection part 230*a* is the part of the secure connector 230 associated (e.g. welded, bolted, riveted, fabricated, bent, or formed) with the structural body 214. In this under-vehicle ground effect system 200, the structural body connection part 230*a* is shown as a pair of brackets (a front face bracket and a back face bracket), each bracket having at least one aperture. The brackets are shown as being attached to the longitudinal length of the structural body 214 and, specifically, one bracket is attached to the front face 214*b* and one bracket is attached to the back face 214*b'*. The bottom face plate connection part 230*b* is the part of the secure connector 230 associated (e.g. integral) with the bottom face plate 220. In this under-vehicle ground effect system 200, the bottom face plate connection part 230*b* is shown as at least one aperture bored through the bottom face plate 220, the aperture(s) in the bottom face plate 220 being substantially coextensive (overlapping) with the respective aperture(s) of the brackets. The joining connection part 230*c* is the connector or joiner of the structural body connection part 230*a* and the bottom face plate connection part 230*b*. The shown joining connection part 230*c* is at least one bolt that may be threaded through the coextensive aperture(s). There may also be additional three-part secure connectors (not shown) along the longitudinal length of the structural body 214 (e.g. along the front face 214*b* and back face 214*b'*). The additional three-part secure connectors 230' may include a structural body connection part, a bottom face plate connection part, and a joining connection part. It should be noted that alternative secure connectors 230, 230' may be variations of the shown structure including, but not limited to, using alternative joining connection parts 230*c*, 230*c'*.

Positioned within the interior compartment 112, 212 of the frame component 110, 210 and behind said replaceable face plate 120, 220 is at least one light source 140, 240, an example of which is shown in FIG. 37. Preferred light sources are backlighting light sources. The light source 140, 240 may be, for example, at least one Oracle LED light pod. Alternatively, the light source 140, 240 may be any light source that is capable of withstanding the rigors of being positioned underneath a vehicle. Light emitted from the at least one light source 140, 240 produces at least one recognizable image when the at least one light source 140, 240 is activated behind the replaceable face plate 120, 220. The light source 140, 240 emits light that, when passing through the at least one cutout 122, 222 produces at least one recognizable image 102, 202, 302. Put another way, the face plate 120, 220 (which is opaque) blocks light from the light source 140, 240, but the removed sections (i.e. the cutouts 122, 222) allow light to pass therethrough. It is the combination of the light and dark that is the recognizable image 102, 202, 302. The at least one recognizable image may be at least one projected recognizable image 102, 202 or at least one backlit recognizable image 302.

Figure 38:
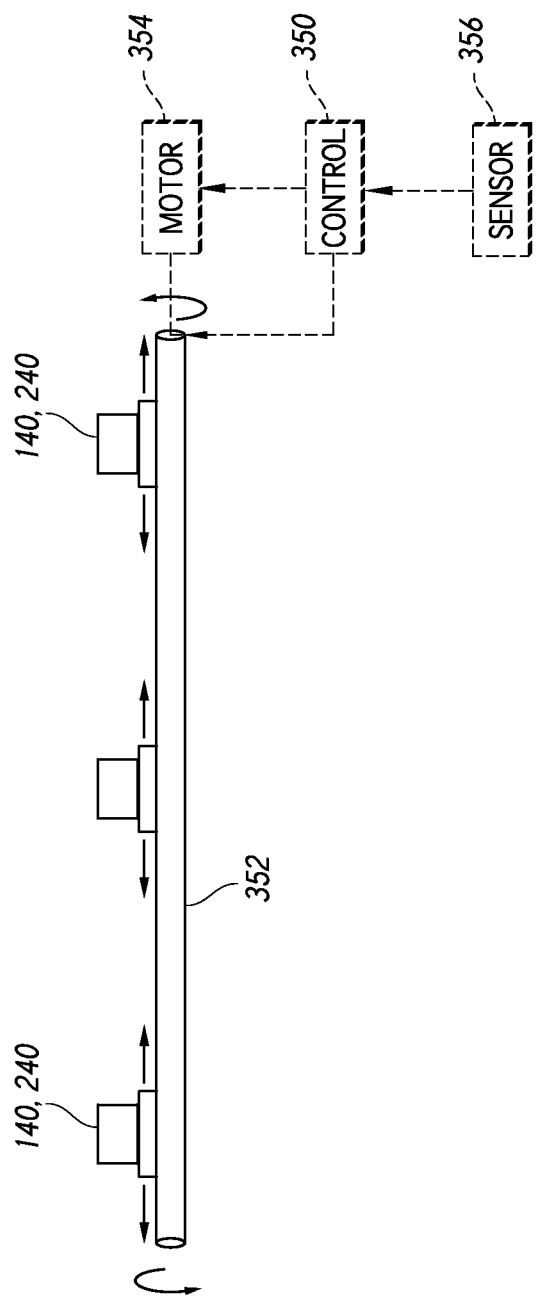
FIG. 38 is a perspective side view of an exemplary light source system capable of movement.

The light source 140, 240 (an example of which is shown in FIG. 37) may be incorporated into a light source system (an example of which is shown in FIG. 38). The light source system includes a light source 140, 240 and at least some type of light source controller 350. The light source controller 350, at a minimum, is a simple on/off switch that activates/deactivates the light source 140, 240. Depending on the capability of the light source(s) 140, 240, the light source controller 350 may control dimming/brightening, selective activation/deactivation of multiple light sources 140, 240 (e.g. some or all of the light sources 140, 240 "blinking" in a pattern), and color of the light source(s) 140, 240. The light source system may also include a motion permitting mount such as a track 352, pegs (not shown), pivots (not shown), or other mounting that permits motion. (The motion may be manual (e.g. to allow adjustment of the position of a projected image 102, 202) or mechanized (e.g. to allow movement of the projected image 102, 202 during use and/or to allow movement of the light in the projected image 102, 202 so as to call attention thereto).) The shown motion permitting mount, the track 352, allows back and forth rotation and horizontal traveling. Other motion permitting mounts would allow other types of motion. A motor 354 (that may be controlled by the light source controller 350) may be used to provide the actual movement of the light source(s) 140, 240.

Although the light source controller 350 may be "hardwired" and/or physically attached to the light source(s) 140, 240, the controller 350 may, alternatively, be a remote controller that facilitates selective control (e.g. activation/deactivation and/or control of the movement) of the light source 140, 240 remotely from locations including, but not limited to, within the vehicle.

The light source controller 350 may receive input from sensors 256 that provide information to the light source controller 350 for the purpose of automatically controlling the light source 140, 240. For example, a light sensor (or a low light sensor) could provide input that there is too much light for the ground effect to be seen and, therefore, deactivate the light source (or activate the light source if it is dark enough to be seen). Another example is that a motion sensor could provide input that the vehicle is moving and, therefore, deactivate the light source. (This would be particularly appropriate if it is illegal to use ground effects while the vehicle is moving.) The controller may be programmed either by the factory or the user to implement these and other functions and would, therefore, have the necessary hardware (e.g. memory, processors, transmitters, receivers) and software (e.g. including a user interface) to implement these features.

Figure 39:
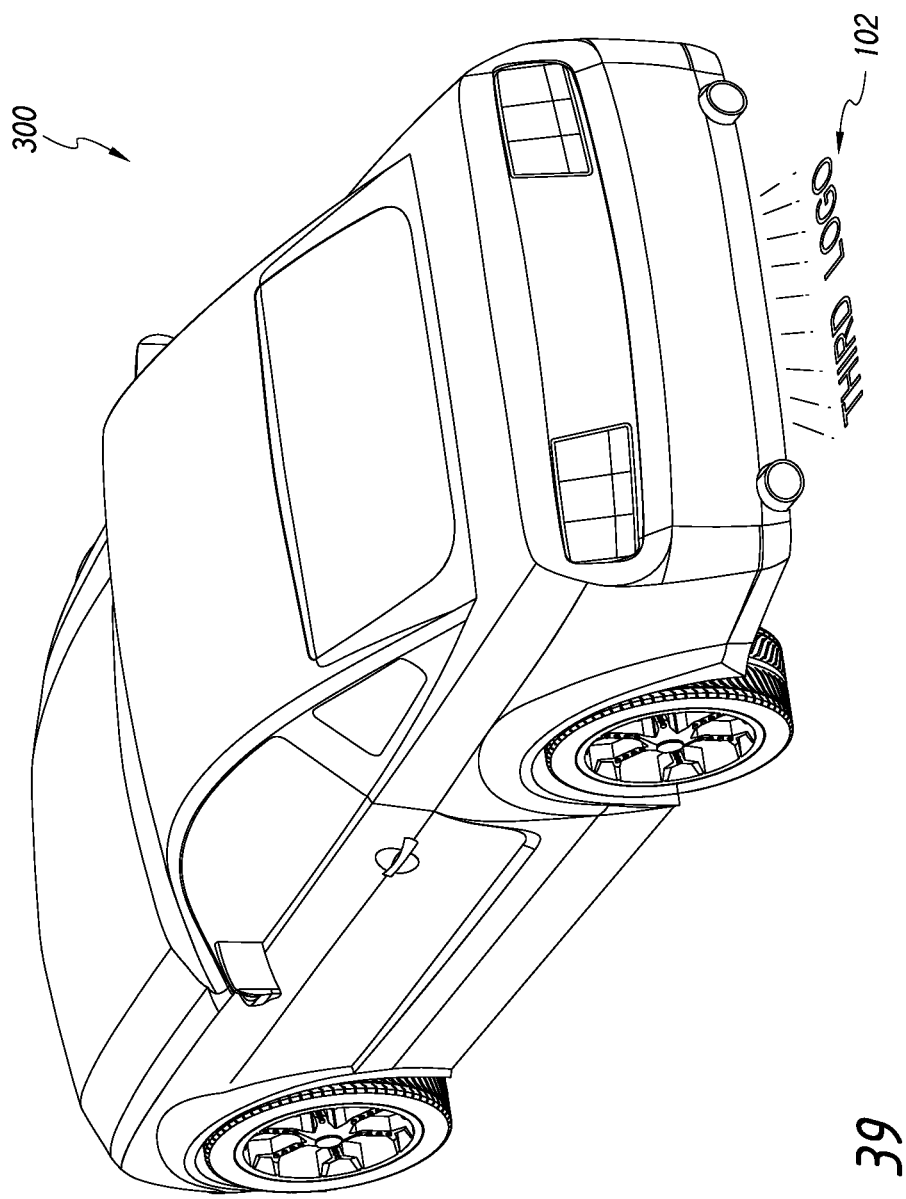
FIG. 39 is a perspective view of an exemplary vehicle having an exemplary under-vehicle ground effect system installed in a rear frame component, an exemplary third logo being projected on the ground.
Figure 40:
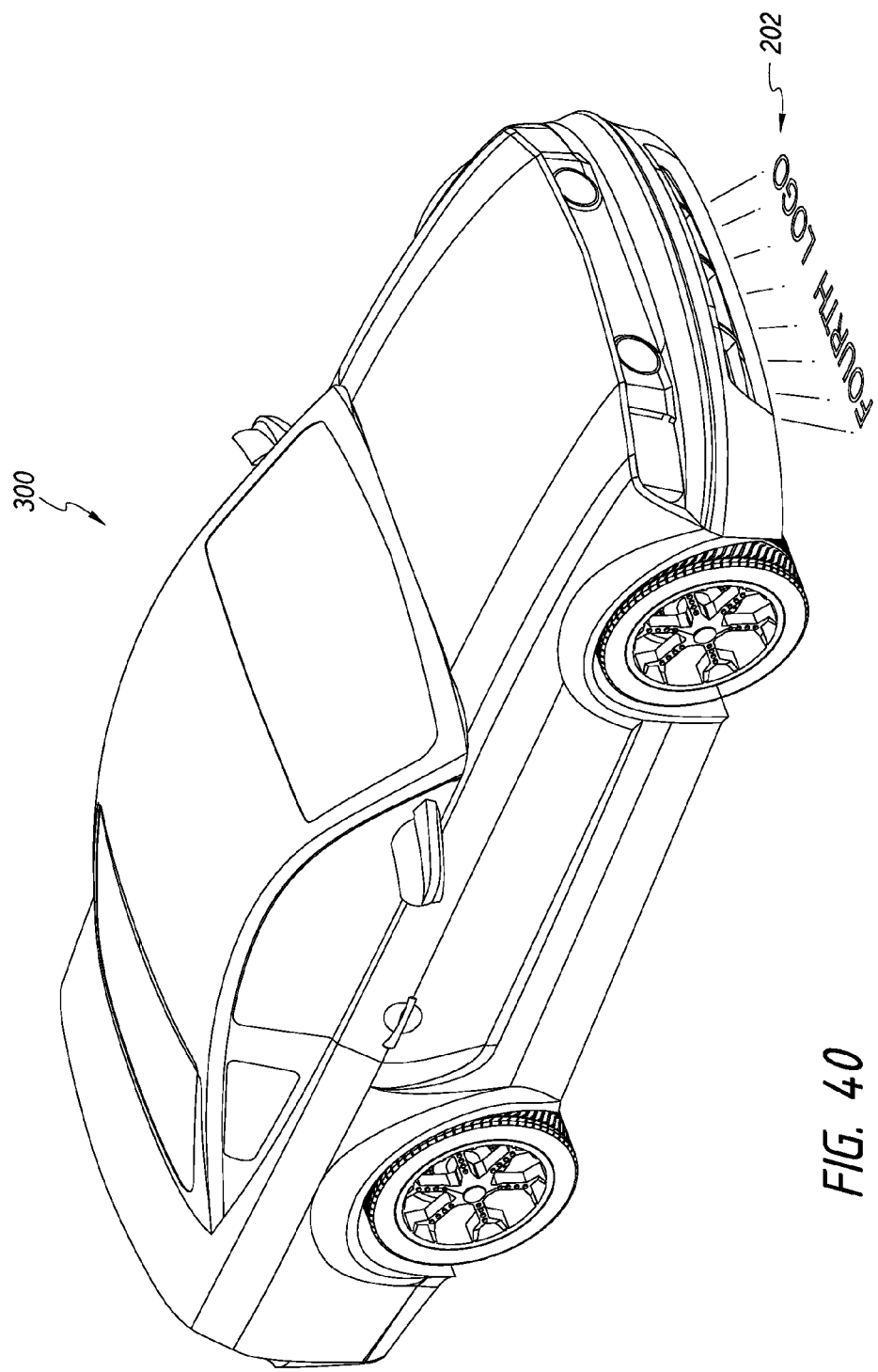
FIG. 40 is a perspective view of an exemplary vehicle having an exemplary under-vehicle ground effect system installed in a front frame component, an exemplary fourth logo being projected on the ground.
Figure 41:
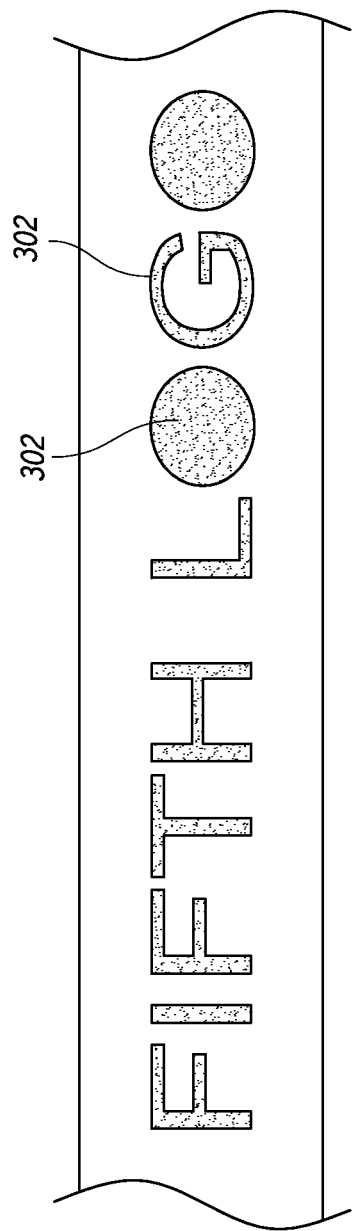
FIG. 41 is a perspective view of a partial exemplary replaceable face plate with an exemplary cutout fifth logo, the exemplary fifth logo being backlit.

Preferred systems 100, 200 facilitate the creation of custom images 102, 202, 302 (e.g. words, numbers, logos, and designs). FIGS. 39 and 40 show exemplary projected custom images 102, 202. As set forth, the bottom replaceable face plates have cutouts defined therein. The cutout (not shown) that would produce the image 102 shown in FIG. 39 would have the words "THIRD LOGO." The cutout (not shown) that would produce the image 202 shown in FIG. 40 would have the words "FOURTH LOGO." FIG. 41 shows a backlit image 302 of "FIFTH LOGO" along with a partial bottom face plate with the words "FIFTH LOGO." The images could be customized by using bottom face plates with different cutouts.

It is to be understood that the inventions, examples, and embodiments described herein are not limited to particularly exemplified materials, methods, and/or structures. It is to be understood that the inventions, examples, and embodiments described herein are to be considered preferred inventions, examples, and embodiments whether specifically identified as such or not.

All references (including, but not limited to, foreign and/or domestic publications, patents, and patent applications) cited herein, whether supra or infra, are hereby incorporated by reference in their entirety.

The terms and expressions that have been employed in the foregoing specification are used as terms of description and not of limitation, and are not intended to exclude equivalents of the features shown and described. While the above is a complete description of selected embodiments of the present invention, it is possible to practice the invention using various alternatives, modifications, adaptations, variations, and/or combinations and their equivalents. It will be appreciated by those of ordinary skill in the art that any arrangement that is calculated to achieve the same purpose may be substituted for the specific embodiment shown. It is also to be understood that the following claims are intended to cover all of the generic and specific features of the invention herein described and all statements of the scope of the invention that, as a matter of language, might be said to fall therebetween.

What is claimed is:

1. An under-vehicle ground effect system that creates recognizable images, said system for use in a vehicle having a chassis with a frame, said frame being the structure portion of said chassis, the system comprising:
   (a) at least one frame component having a structural body, said at least one frame component for use as part of said frame, said structural body defining an interior compartment;
   (b) a replaceable face plate securely attachable to said structural body using at least one secure connector, said replaceable face plate substantially enclosing said interior compartment when secured to said structural body using at least one secure connector;
   (c) said replaceable face plate having at least one cutout defined therein; and
   (d) at least one light source positioned within said interior compartment and behind said replaceable face plate;
   (e) wherein light from said at least one light source produces at least one recognizable image when said at least one light source is activated behind said replaceable face plate.

2. The system of claim 1, said at least one frame component being a cross member.

3. The system of claim 1, said at least one frame component being a side rail.

4. The system of claim 1, said structural body having a top face, a front face, and a back face, said front face being substantially parallel to the back face, and said top face at least substantially spanning the distance between said front face and said back face.

5. The system of claim 1, said structural body having a top face, a front face, and a back face, said front face being substantially parallel to the back face, said top face at least substantially spanning the distance between said front face and said back face, and said replaceable face plate being substantially parallel to said top face.

6. The system of claim 1, said at least one secure connector being at least one three-part secure connector including at least one structural body connection part, at least one bottom face plate connection part, and at least one joining connection part.

7. The system of claim 1, said at least one secure connector being at least one three-part secure connector including at least one structural body connection part, at least one bottom face plate connection part, and at least one joining connection part, said at least one structural body connection part being perpendicular to said structural body.

8. The system of claim 1, said structural body having a top face, a front face, and a back face, said at least one secure connector being at least one three-part secure connector including at least one structural body connection part, at least one bottom face plate connection part, and at least one joining connection part, at least one of said at least one structural body connection parts being associated with said front face and at least one of said at least one structural body connection parts being associated with said back face.

9. The system of claim 1, said at least one recognizable image being at least one projected recognizable image.

10. The system of claim 1, said at least one recognizable image being at least one backlit recognizable image.

11. An under-vehicle ground effect system that creates recognizable images, said system for use in a vehicle having a chassis with a frame, said frame being the structure portion of said chassis, the system comprising:
    (a) at least one frame component having a structural body, said at least one frame component for use as part of said frame, said structural body defining an interior compartment, said structural body having a top face, a front face, and a back face, said front face being substantially parallel to the back face, and said top face at least substantially spanning the distance between said front face and said back face;
    (b) a replaceable face plate securely attachable to said structural body using at least one secure connector, said replaceable face plate being substantially parallel to said top face and enclosing said interior compartment when secured to said structural body using at least one secure connector;
    (c) said replaceable face plate having at least one cutout defined therein; and
    (d) at least one light source positioned within said interior compartment and behind said replaceable face plate;
    (e) wherein light from said at least one light source produces at least one recognizable image when said at least one light source is activated behind said replaceable face plate.

12. The system of claim 11, said at least one frame component being a cross member.

13. The system of claim 11, said at least one frame component being a side rail.

14. The system of claim 11, said at least one secure connector being at least one three-part secure connector including at least one structural body connection part, at least one bottom face plate connection part, and at least one joining connection part.

15. The system of claim 11, said at least one recognizable image being at least one projected recognizable image.

16. The system of claim 11, said at least one recognizable image being at least one backlit recognizable image.

17. An under-vehicle ground effect system that creates recognizable images, said system for use in a vehicle having a chassis with a frame, said frame being the structure portion of said chassis, the system comprising:
    (a) at least one frame component having a structural body, said at least one frame component for use as part of said frame, said structural body defining an interior compartment, said structural body having a top face, a front face, and a back face, said front face being substantially parallel to the back face, and said top face at least substantially spanning the distance between said front face and said back face;

(b) a replaceable face plate securely attachable to said structural body using at least one three-part secure connector including at least one structural body connection part, at least one bottom face plate connection part, and at least one joining connection part, said replaceable face plate being substantially parallel to said top face and enclosing said interior compartment when secured to said structural body using at least one three-part secure connector;

(c) said replaceable face plate having at least one cutout defined therein; and (d) at least one light source positioned within said interior compartment and behind said replaceable face plate;

(e) wherein light from said at least one light source produces at least one recognizable image when said at least one light source is activated behind said replaceable face plate.

18. The system of claim 17, said at least one frame component being a cross member or a side rail.

19. The system of claim 17, said at least one recognizable image being at least one projected recognizable image or at least one backlit recognizable image.

* * * * *